United States Patent [19]

Yokota et al.

[11] Patent Number: 5,440,743
[45] Date of Patent: Aug. 8, 1995

[54] DEADLOCK DETECTING SYSTEM

[75] Inventors: Haruo Yokota; Hajime Kitakami; Yasuo Noguchi; Naoki Akaboshi, all of Kawasaki, Japan

[73] Assignee: Fujitsu Limited, Kawasaki, Japan

[21] Appl. No.: 259,161

[22] Filed: Jun. 13, 1994

Related U.S. Application Data

[63] Continuation of Ser. No. 119,828, Sep. 13, 1993, abandoned, which is a continuation of Ser. No. 801,547, Dec. 2, 1991, abandoned.

[30] Foreign Application Priority Data

Nov. 30, 1990 [JP] Japan ................. 2-329658

[51] Int. Cl.[6] ............................................. G06F 13/14
[52] U.S. Cl. ............................. 395/650; 364/DIG. 1; 364/281.5
[58] Field of Search ............................ 395/650, 725

[56] References Cited

U.S. PATENT DOCUMENTS

| | | | |
|---|---|---|---|
| 4,189,771 | 2/1980 | Roever | 364/DIG. 1 |
| 4,318,182 | 3/1982 | Bachman et al. | 364/DIG. 1 |
| 4,480,304 | 10/1984 | Carr et al. | 364/DIG. 1 |
| 4,791,554 | 12/1988 | Hirota et al. | 364/DIG. 1 |
| 5,016,167 | 5/1991 | Nguyen et al. | 364/DIG. 1 |
| 5,095,421 | 3/1992 | Freund | 395/650 |

Primary Examiner—Thomas M. Heckler
Attorney, Agent, or Firm—Staas & Halsey

[57] ABSTRACT

A deadlock detection system each comprise a lock control table having entries corresponding to a resource when a plurality of resource requesters share a plurality of resources, a resource requester identifier list connected to a table of the lock control table, and a lock controller for managing an exclusive control by using the lock control table and the resource requester identifier list and for detecting a deadlock by examining a sequence inversion among resource requester identifiers on a list among competing resource requesters. An element of the resource requester identifier list can distinguish a shared lock from an exclusive lock by transferring a lock list obtained through a breakdown according to the content of a shared lock, and by independently examining the sequence inversion of resource requester identifier of the list among competing resource requesters.

22 Claims, 26 Drawing Sheets

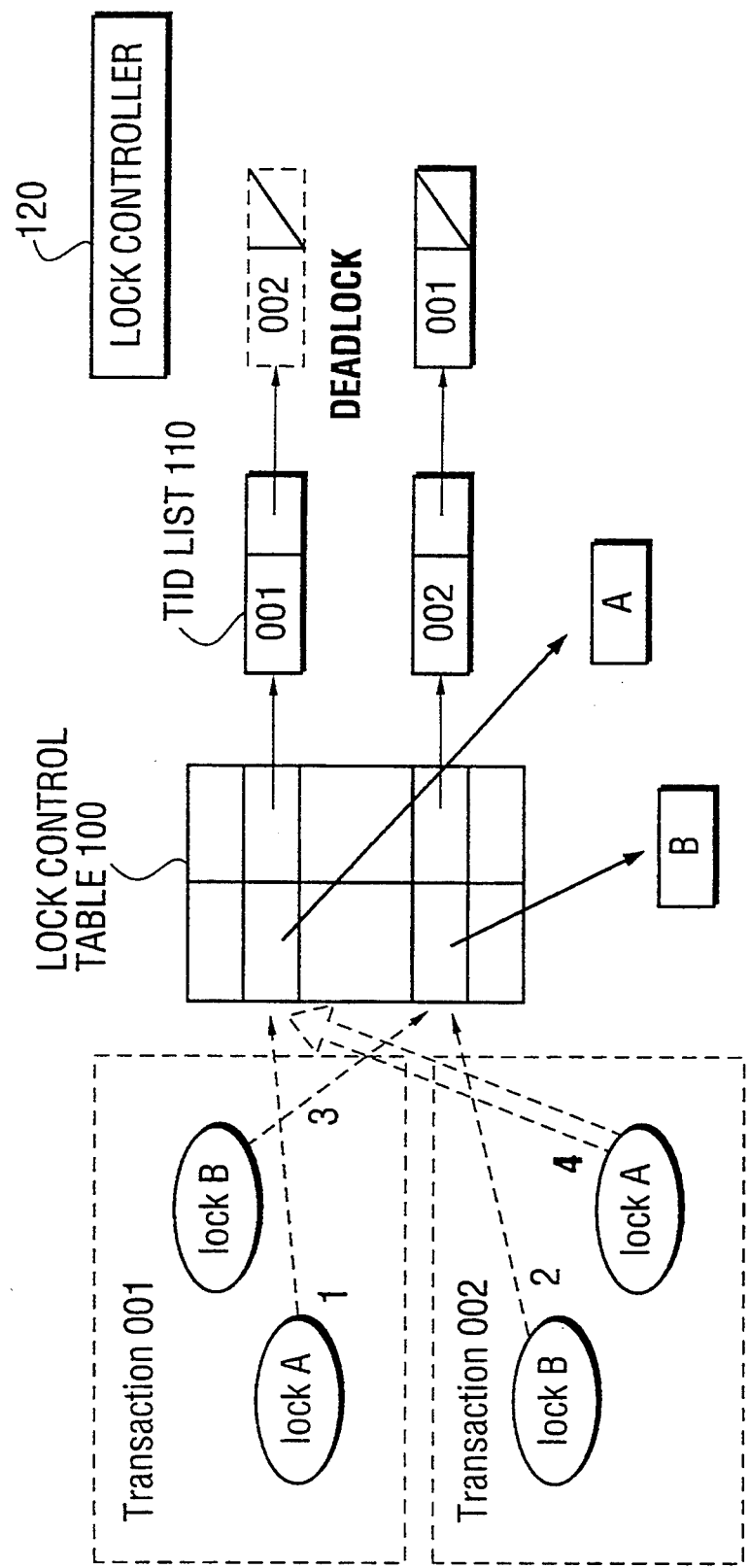

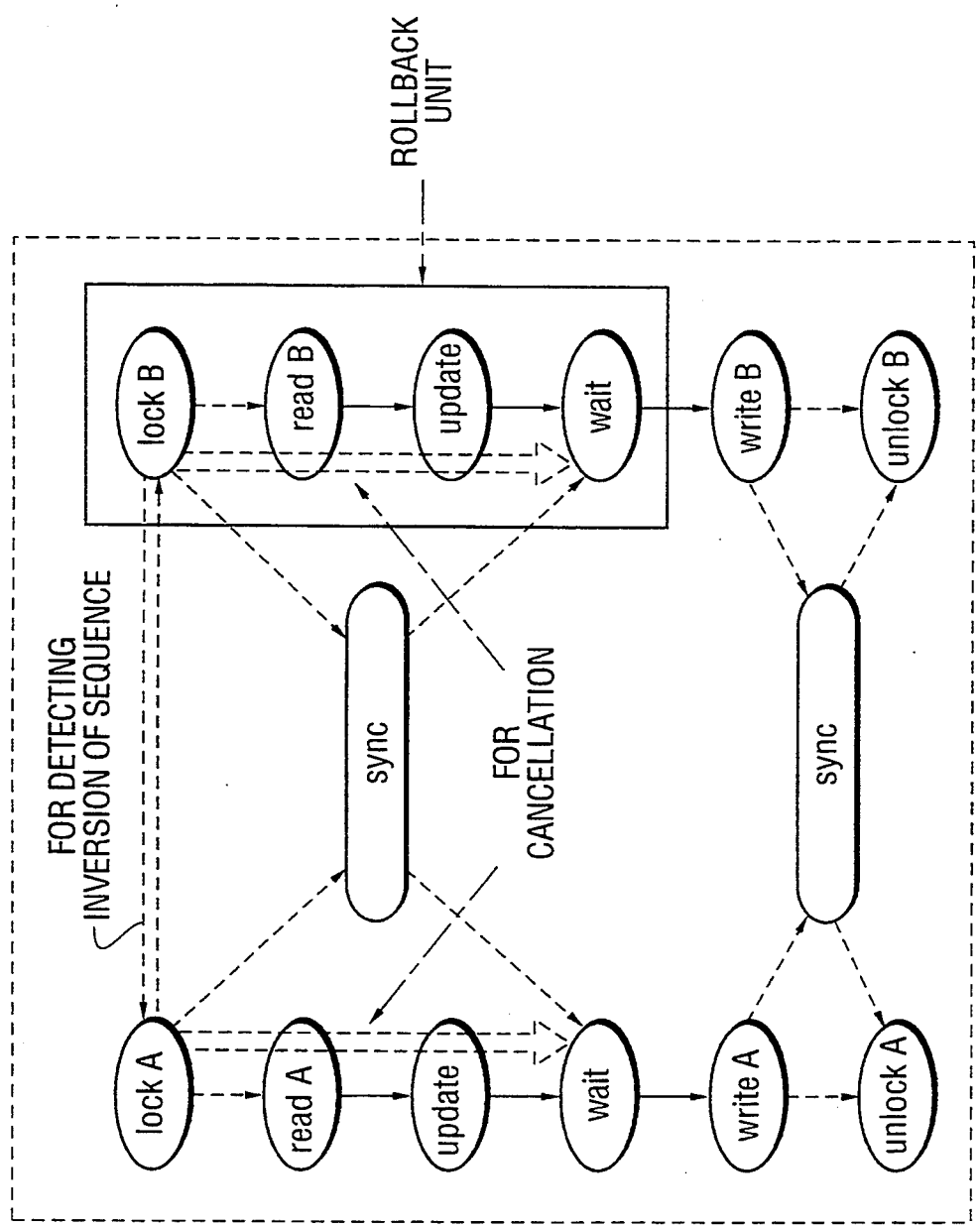

FIG. 6
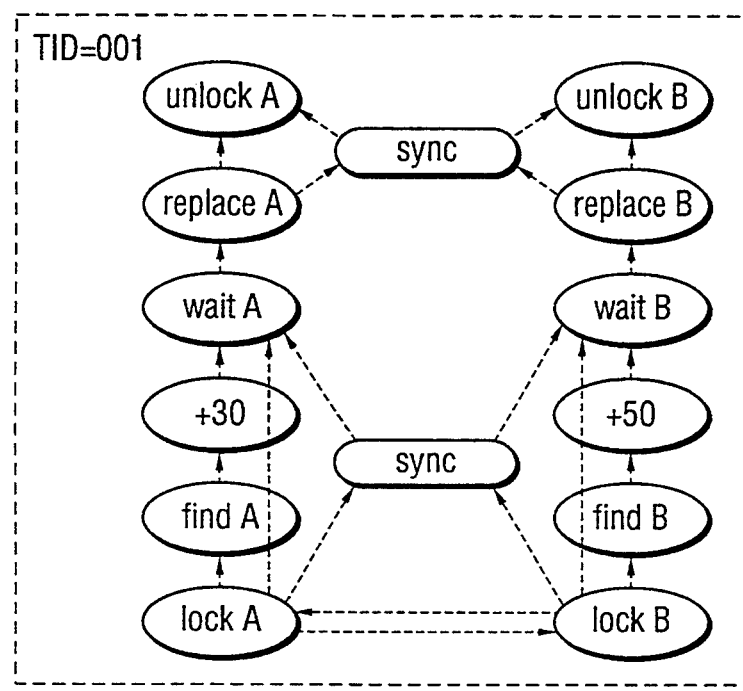
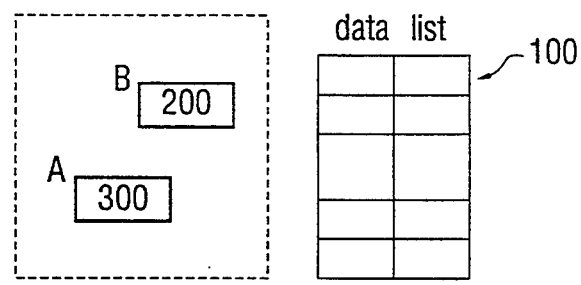
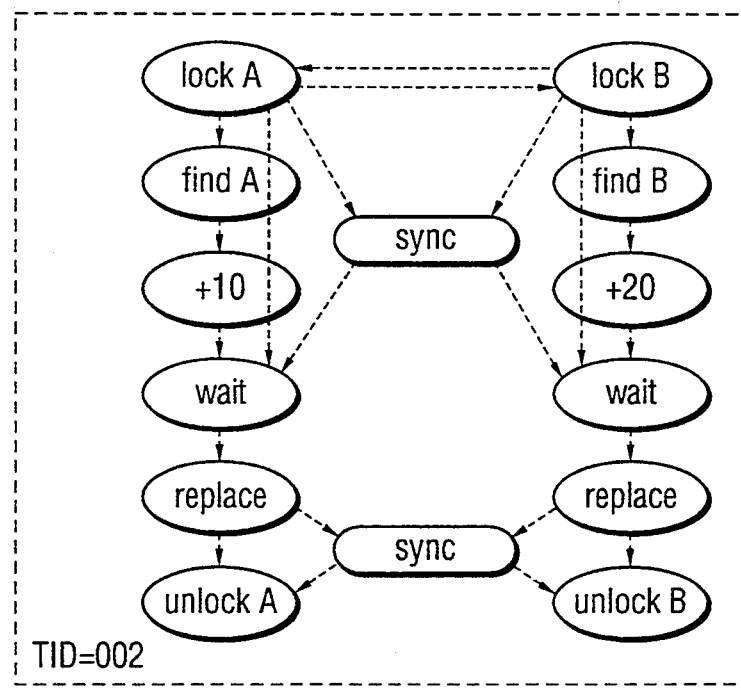

FIG. 7
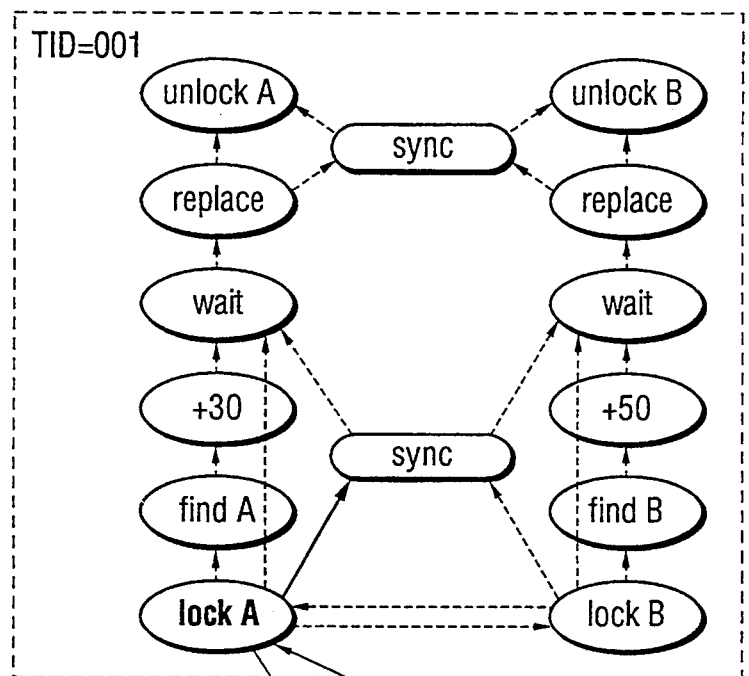
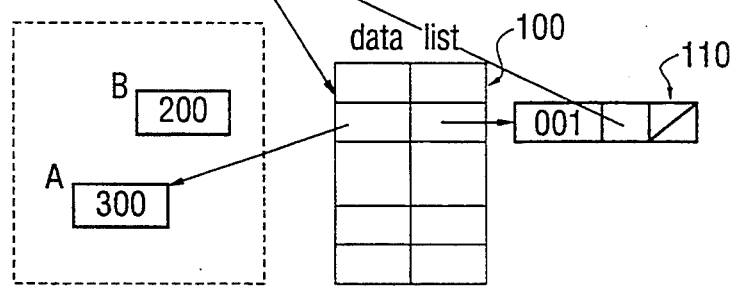
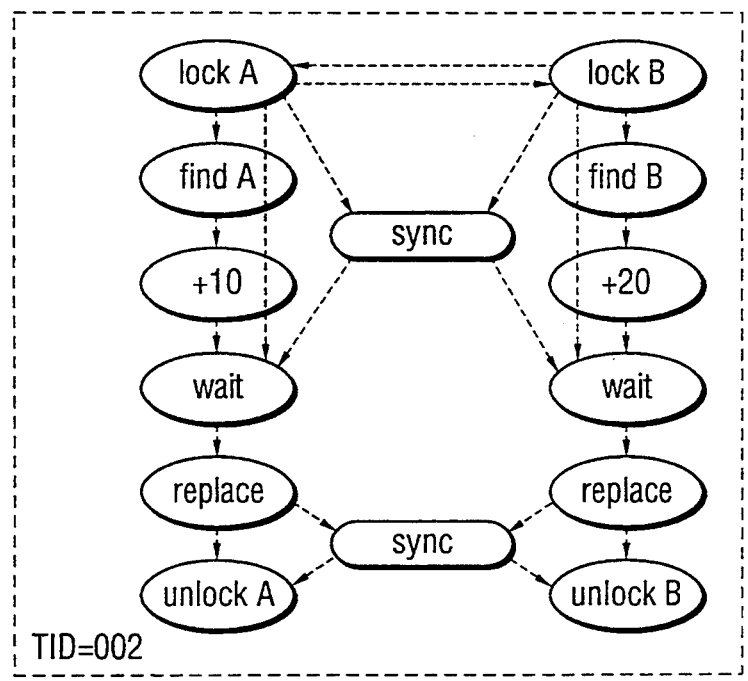

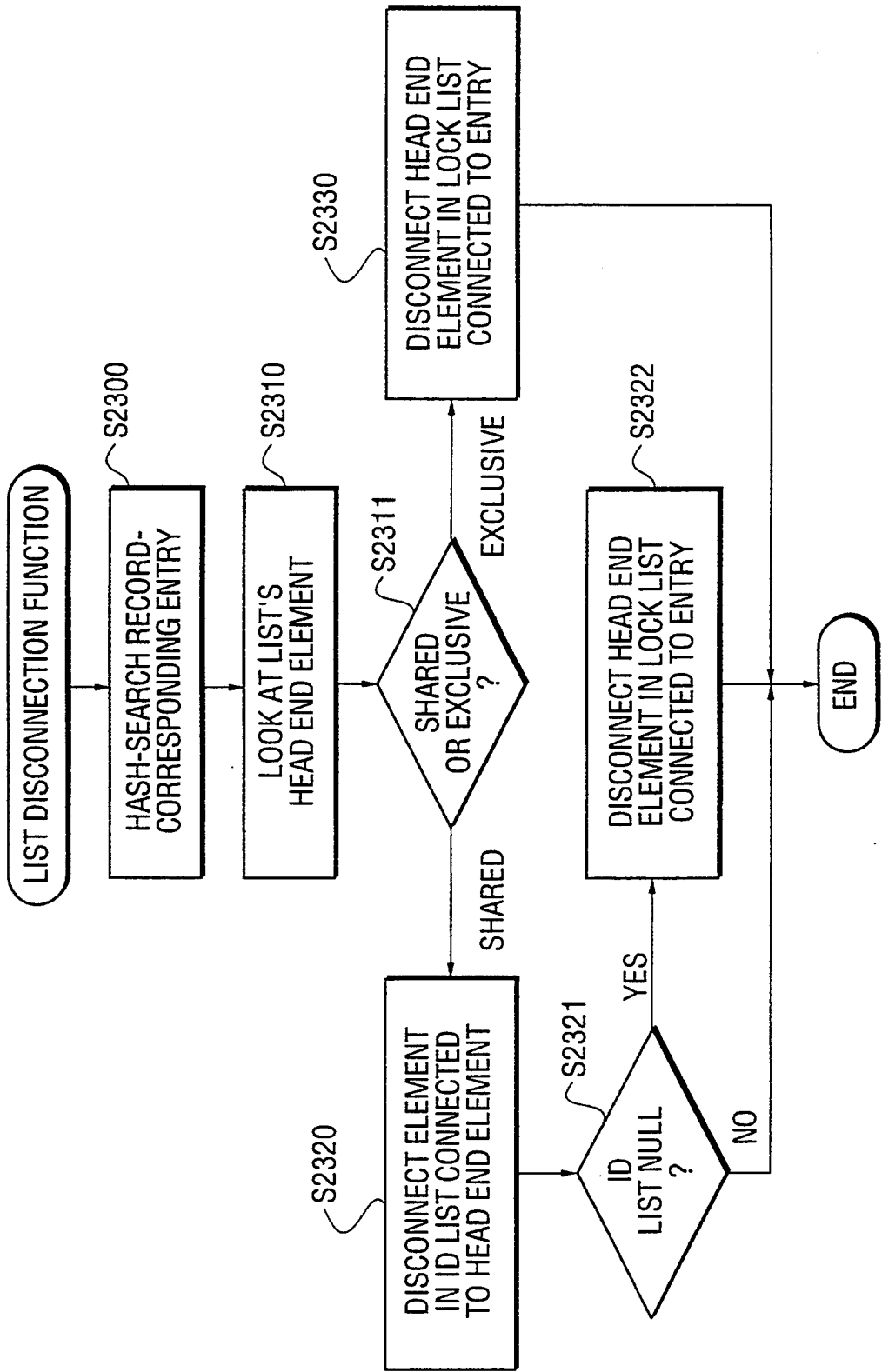

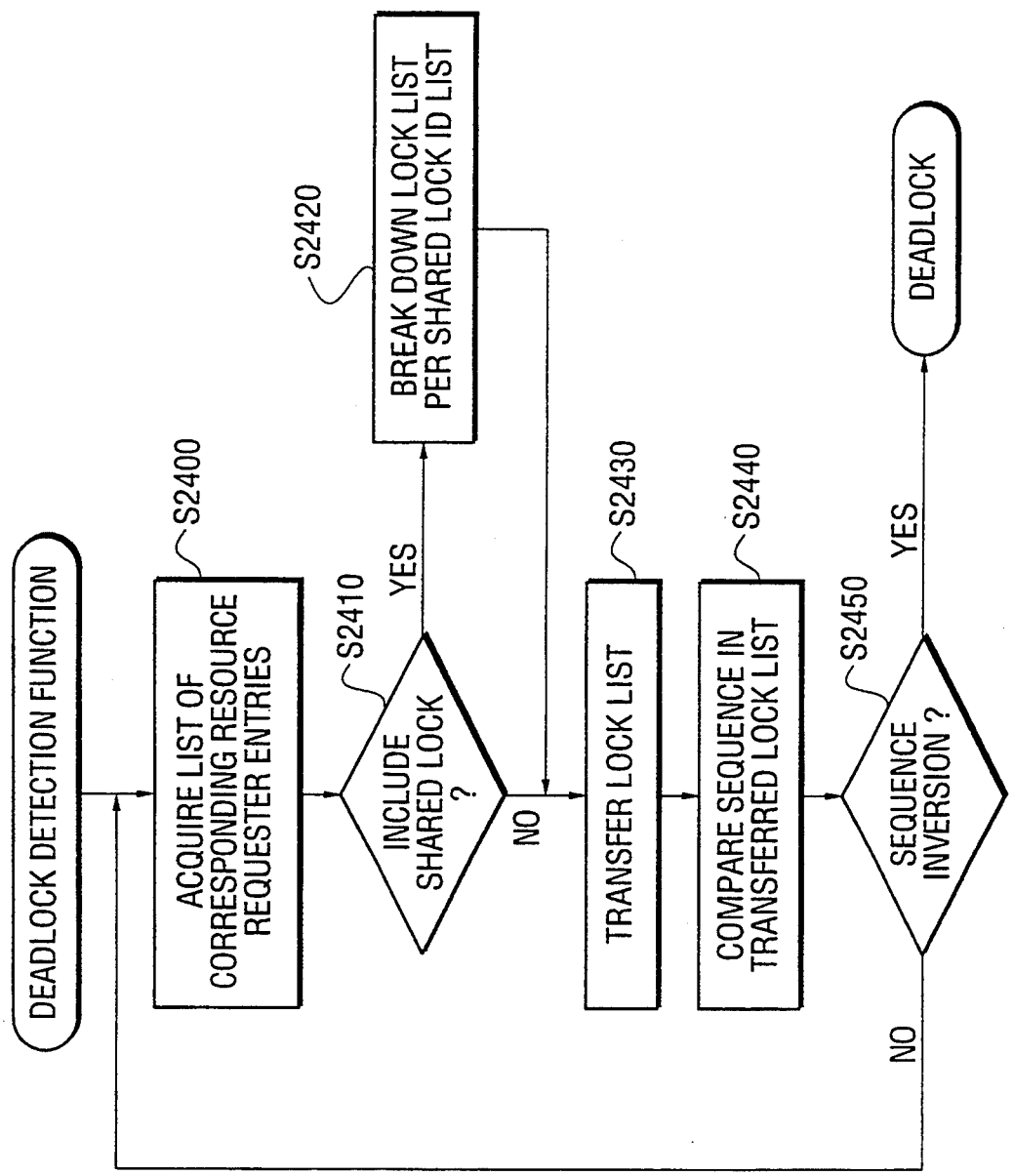

DEADLOCK DETECTING SYSTEM

This application is a continuation of application Ser. No. 08/119,828, filed on Sep. 13, 1993, abandoned, which is a continuation of application Ser. No. 07/801,547, filed Dec. 2, 1991, abandoned.

BACKGROUND OF THE INVENTION

This invention pertains to a deadlock detecting system for detecting a deadlock by examining an inversion of sequences of resource requester identifiers in a list among competing resource requesters, by performing an exclusive control for a read and write operation using a lock control table having entries corresponding to resources and a list of resource requester identifiers which is connected to the table, when a plurality of resource requesters share a plurality of resources.

Description of the Related Art

A data processor, such as a computer, sometimes allows a plurality of resource requesters to share a plurality of resources, such as in a transaction processing. In such a case, the controlling method for simultaneously executing transactions greatly influences system performance. Therefore, it is desired that an efficient controlling method by which a computer can simultaneously execute transactions is developed. In Particular, there is a possibility that a deadlock of an operation is caused in simultaneously executed transactions.

Summary of the Invention

The present invention aims at increasing an efficiency of a parallel operation of transactions, and providing a deadlock detecting system for use in a segmenting processing for parallel operations and for simplifying a rollback processing after a deadlock is detected.

This invention is premised on a lock control device for enabling a plurality of resource requesters to share a plurality of resources.

The lock control device utilizes a lock control table having entries corresponding to resources.

The lock control device also utilizes a list connected to the entries. This list comprises identifiers indicating the requesters of resources corresponding to the entries of the lock control table.

The lock control device comprises a lock controller for controlling the lock control table and the list, for detecting a deadlock, and for executing rollback processings related to the deadlock. The lock controller detects a deadlock by detecting sequence inversions of listed identifiers of resource requesters among competing resource requesters.

The list in the above form of the invention has a pointer for indicating a processing for having a resource requester corresponding to the identifier initiate the processing. The lock controller obtains the entries of a lock control table from the resource identifiers through a hashing operation.

When the resource requester is formed of the transaction, the above form of this invention dissolves the transaction into basic processing units, e.g. comprising "lock", "find", "update", "wait", "replace" and "unlock" operations. According to data and control dependencies among the basic processing, the basic processings are performed in parallel. At this time, the basic processing unit is a resource requester, and the transaction identifiers listed in the list as requester identifiers are transferred among the basic processing units within the transaction, such that the deadlocks are detected in the basic processing units. The rollback processing related to a deadlock is a rollback only within a group of basic processing units related to the deadlock, namely, within only basic processing units causing the deadlock.

In addition to the above form of this invention, the lock control device can further comprise a synchronizer for preventing a change of the resources until all locks in a transaction are acquired and for enabling a rollback to be performed when a deadlock occurs. The lock controller performs a lock operation. The lock controller performs a rollback process of abandoning the currently held data and of holding new data, on receiving a rollback instruction before receiving a control by the synchronizer for acquiring a Synchronization.

Also, there is a shared lock, as well as an exclusive lock. The shared lock is performed when a plurality of processings access a single resource simultaneously, such as in a read operation. The exclusive lock is performed when a single processings can access a single resource such as in a write operation. An adoption of the shared locks should raise the number of processings contemporaneously executable by competing resource requesters.

Further, with the above form of this invention, when a lock control device for managing an exclusive control controls a shared lock separately from an exclusive lock by using the same lock table, the list includes an element for identifying a shared lock and an exclusive lock. The lock controller interchanges the lists dissolved by the content of the shared lock, and independently examines the sequence inversion of the resource requester identifiers of the lists for the competing resource requesters, thereby detecting the deadlock. The element of the list for distinguishing a shared lock from an exclusive lock can be a distinguishing identifier attached to the list or a tag for distinguishing.

The above form of this invention enables a check of list sequence to detect a deadlock through a lock control by a lock control table and a list of resource requester identifiers.

In order to find a deadlock the maximum number of the TID searches which should be performed is equal to a product of the number of entries connected to the locally requested resources and the list length. Because the maximum list length is the number of resource requesters, this invention ensures a deadlock to be detected at a faster rate compared with a method of detecting a deadlock by a time interval between a transmission of a request and a return of the acknowledgement.

In particular, the processing speed of a transaction processing can be improved of by using a plurality of processors by distributing a processing load to detecting a deadlock by using the deadlock detecting method for paralleling a basic processing according to the control flows and data flows among basic processings. By braking down a transaction into a basic processing, a rollback processing after detecting a deadlock eliminates the necessity for redoing the processing for the entire transaction because only the part pertaining to the deadlock needs to be redone. This reduces the processing for a rollback and enables a processing performance to be improved.

A use of an entry for a lock control table "as is" for the deadlock detection prevents an illusory deadlock (phantom lock) arising from a discrepancy between an actual lock state and the list for detecting a deadlock.

A distinction between a shared lock and an exclusive lock for a lock control including a deadlock detection, i.e. a separation of list elements related to the lock control table into a shared lock and an exclusive lock, a connection of a list of resource request sources to be shared to the shared lock and a detection of a deadlock through a segmentation of the list by a shared resource of a shared lock, allow a shared lock i.e. allow a single resource to be simultaneously read from a plurality of requesters, and enable a deadlock to be detected in parallel, thereby enabling a deadlock to be detected efficiently.

BRIEF DESCRIPTION OF THE DRAWINGS

Those in the same field can easily understand the additional objects and features of this invention from the description of a preferred embodiment and some of the attached drawings.

FIGS. 2A and 2B explain the underlying principle of this invention;

FIG. 6 illustrates an initial state (1);

FIG. 7 illustrates a state (2);

FIG. 23 is an operational flowchart of a list disconnection processing; and

FIG. 24 is an operational flowchart of a deadlock detection processing.

DESCRIPTION OF THE PREFERRED EMBODIMENTS

We disclose a parallel transaction processing system in Japanese patent application No. Tokuganhei 1(1989)-18790, "A Transaction Processing System" which is herein incorporated by reference. The system breaks down a transaction into basic processing units such as record locking, reading, content revision, and writing, for flexibly and efficiently controlling simultaneous executions. For efficient parallel processing, dependencies among controls and data across basic processing units are expressed in graphical form, thereby suspending or resuming the basic processings, such that a plurality of transaction processings are executed concurrently.

Because this system dynamically determines the optimal execution sequences among basic processing units, a processing not requiring a wait for a lock is executed in advance without having to wait for an unlock of a bottleneck processing. In this case, there is no necessity for a program to include a scheduling in consideration of lock dependencies. Because graphs are created for respective applications, this system is applicable for general purposes.

Figure 1A:
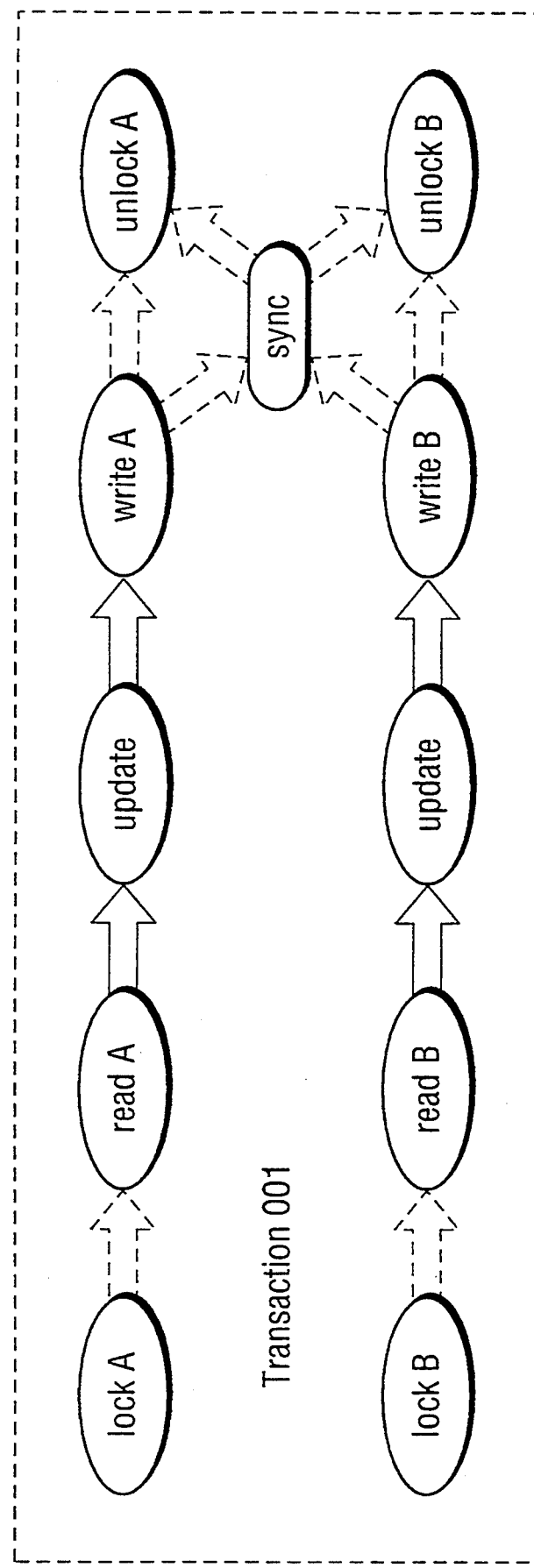
FIGS. 1A and 1B illustrate transaction processings.
Figure 1B:
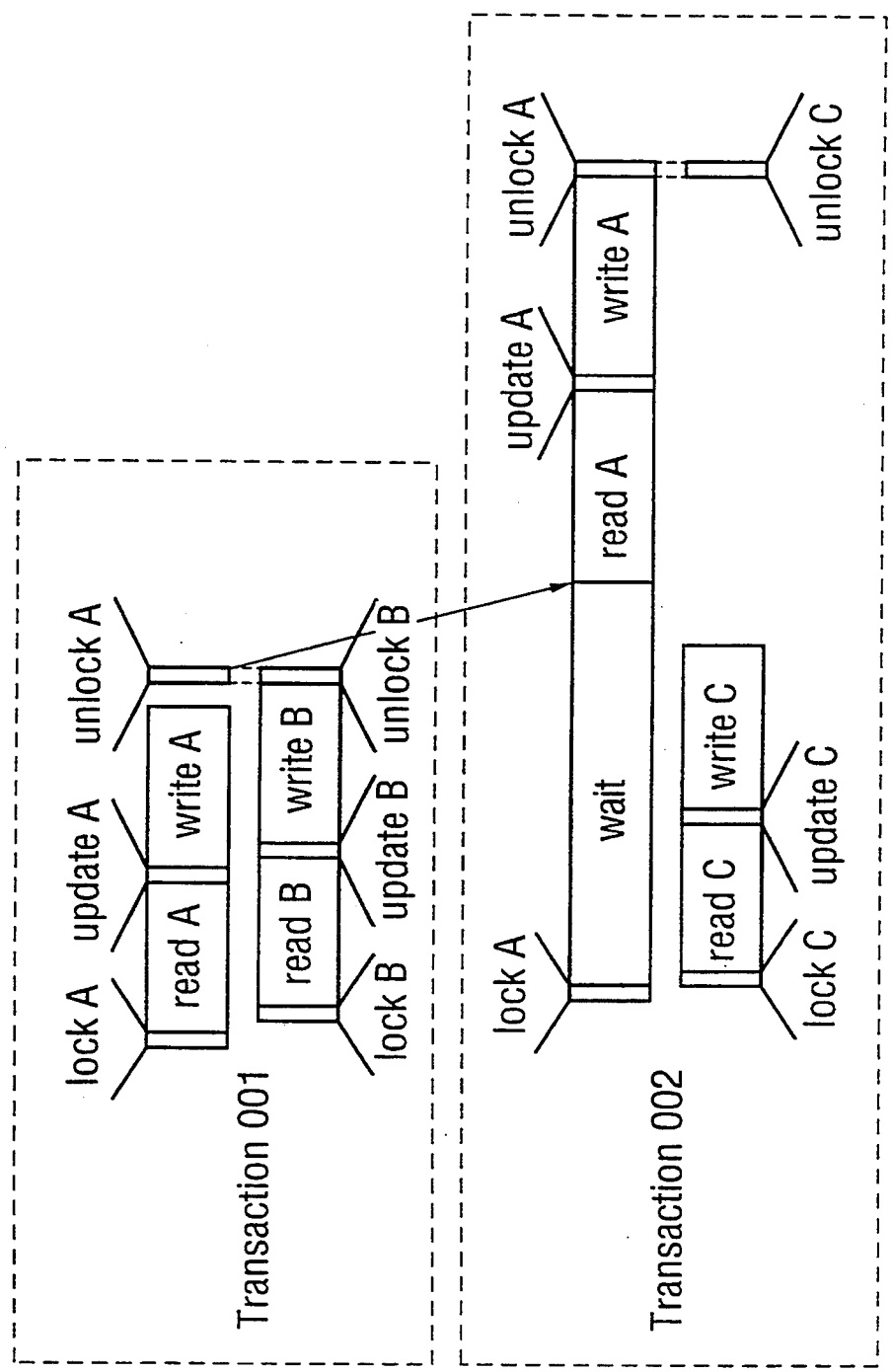

FIGS. 1A and 1B illustrate transaction processings.

As shown in FIG. 1A, a separating means for separating a transaction into basic processing units separates a transaction 001 into "lock A", "read A", "update A", "write A" and "unlock A", as well as "lock B", "read B", "update B", "write B" and "unlock B". According to the dependencies of data processings among basic processing units, a synchronizer "sync" activates "unlock A" and "unlock B" when executions of both "write A" and "write B" are completed. Thus, dependencies among transactions are executed in parallel.

As shown in FIG. 1B, transaction 001 can execute "lock B", "read B", "update B", and "write B" "unlock B" for record B, while executing "lock A", "read A", "update A" and "write A" "unlock A" for a record A. Upon completing both "write A" for record A and "write B" for record B, transaction 001 causes "unlock A" for record A and "unlock B" for record B to be executed.

Because transaction 001 causes record A to be put into "lock A" record A is put into a wait state in transaction 002. Transaction 001 does not cause a record C to be locked. Thus, a transaction 002 executes its processings, i.e. "lock C", "read C", "update C" and "write C", for record C in parallel with transaction 001 executing its processings for record A and record B. Transaction 002 executes the processings for record C while transaction 002 keeps the processing for record A in a wait state. When transaction 001 completes processings for record A and allows "unlock A" to be executed for record A, transaction 002 executes "read A", "update A" and "write A" for record A. Then, transaction 002 executes "unlock A" and "unlock C" similarly for record A and record C As described above, a separation of a transaction into basic processings comprising "lock A", "read A", "update A" and "unlock A" enables transaction 001 to execute its processings for record B, which is not locked, while transaction 002 executes processings for record A. The separation of the transaction also enables transaction 002 to execute its processing for record C which is not locked while transaction 001 executes processings for record A and record B.

However, such parallel operations could cause a deadlock in which both transactions are put in a wait state. A solution for avoiding a deadlock has been studied.

Although a segmentation of processings could invite a deadlock, there are problems that the ways of detecting a deadlock and the ways of rolling back transaction units when a deadlock is detected have not been clear.

Not only transaction processings but also controlling of generic resources such as OS requires a method for detecting a deadlock.

FIGS. 2A and 2B explain the underlying principle of this invention. Lock control table 100 provides a correspondence between a pointer pointing to record A and record B, for example, and a pointer pointing to a lock list or TID list 110 which comprises a list of transactions for requesting respective records A and B to provide resources. An element of the lock list 110 comprises a transaction ID of a transaction connected to a particular record and a pointer pointing to the following transaction ID. A lock controller 120 controls lock control table 100 and the lock list 110, for detecting a deadlock and for executing rollback processings related to the deadlock.

As shown in FIG. 2A, assume there are transactions 001 and 002. When records A and B cause a deadlock, a TID (transaction identifier) list corresponding to record A shows that 001 is before 002 and a TID list corresponding to record B shows that 002 is before 001. In such a case, unless either one of records A and B is released, the processing does not progress but remains in a deadlock.

At this time, when a plurality of records are locked among respective transactions, a deadlock is detected by interchanging TID numbers through a communication among lock processings.

When a transaction processing is broken down into basic processing units and executed in parallel according to record dependencies, a deadlock detection is executed in parallel by pluralizing lock processings. Also, it, becomes possible to limit the rollback processing after a deadlock detection to the part pertinent to the deadlock rather than the entire transaction. That is, a deadlock read out once needs to be read out again if the deadlock is relevant, whereas the part irrelevant to the deadlock can be utilized "as is". This reduces the amount of rollback processing. A graph of relations among basic processings can segregate the relevant part from the irrelevant part with regard to the deadlock.

Assume in FIG. 2A that initially transaction 001 uses record A and transaction 002 uses record B, and then transaction 001 requests record B and transaction 002 requests record A. Transaction 001 does not unlock record A unless transaction 002 unlocks record B. Transaction 002 does not unlock record B unless transaction 001 unlocks record A. Therefore, transaction 001 waits for transaction 002 to unlock record B and transaction 002 ,waits for transaction 001 to unlock record A.

A lock control table 100 shows a deadlock state by putting a cell 001 in record A and putting cell 001 next to a cell 002 in record B. Thus, when transaction 002 requests record A, because cell 002 is processed after cell 001 in the list of record A, transaction 002 is judged to have a deadlock when cell 001 positioned before cell 002 in the list for record A is behind cell 002 in the list for record B. When transaction 002 is judged to have a deadlock, processings of transaction 002 for record B by cell 002 are canceled to enable a rollback to be executed, and transaction 001 is executed in parallel for records A and B.

Explanation of Preferred Embodiments

Figure 3:
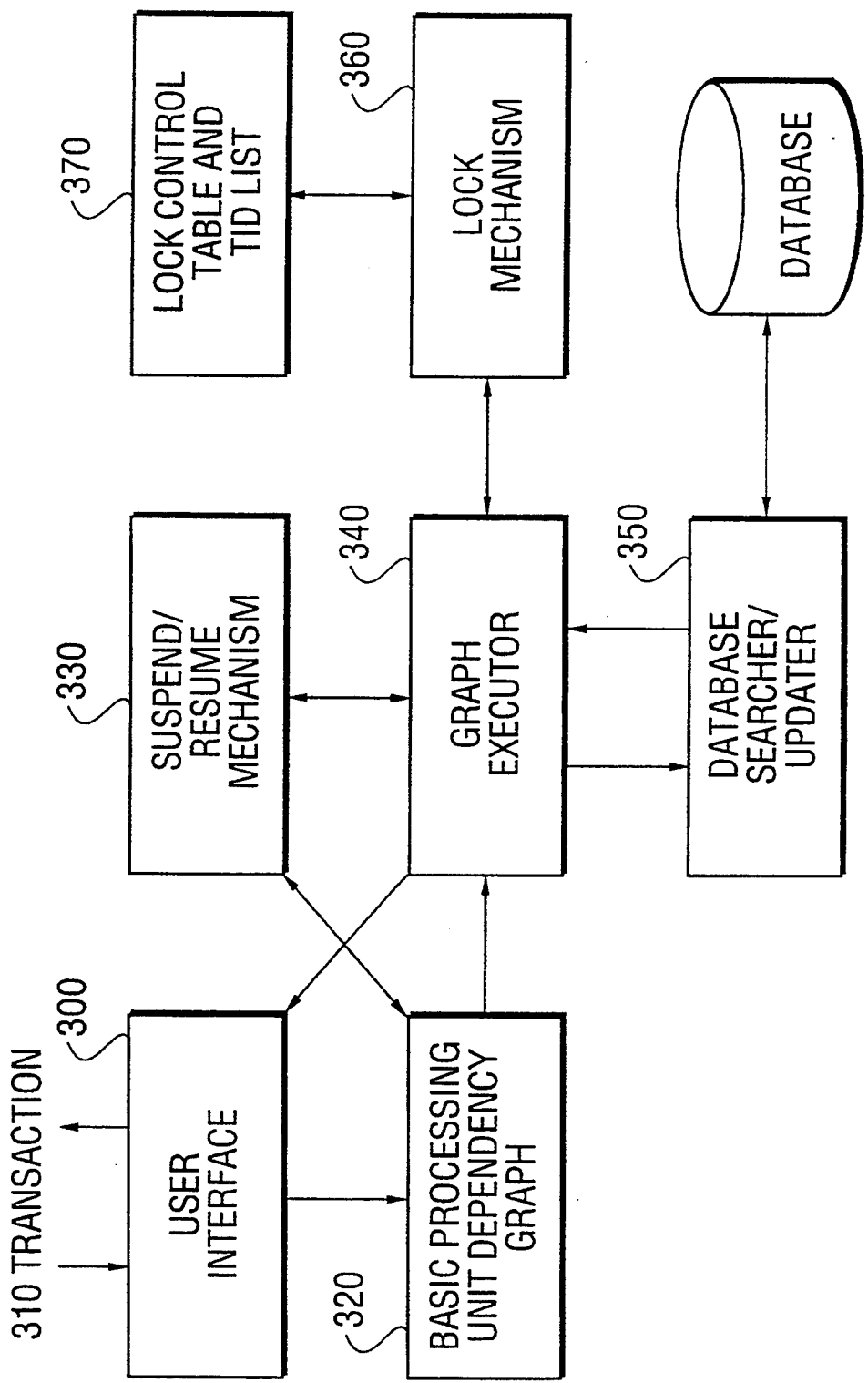
FIG. 3 shows a system configuration of a preferred embodiment of this invention.

FIG. 3 shows a system configuration of a preferred embodiment of this invention.

A generic computer can realize the system according to the preferred embodiment of this invention.

A user interface 300 receives a transaction 310 to be processed and presents the processing result to a user. A basic processing unit dependency graph 320 stores graphical expressions of basic processing units split from transaction processings. A basic processing unit dependency graph can be prepared in advance, or such a graph can be created when a transaction is inputted.

A transaction 310 inputted through a user interface 300 ignites a corresponding node in the basic processing unit dependency graph 320.

A suspend/resume mechanism 330 checks whether or not a node in the basic processing unit dependency graph 320 is ignited and notifies a graph executor 340 of the ignited graph node.

The graph executor 340 executes a transaction provided at a graph node according to an instruction from the suspend/resume mechanism 330. On executing a transaction provided at a database access node in the basic unit dependency graph 320, the graph executor 340 issues an access request to a database searcher/updater 350. When an exclusive control requires a lock, the graph executor 340 issues a lock request to a lock mechanism 360.

The lock mechanism 360 operates a lock processing and an unlock processing by referring to a lock control table and a TID (transaction identifier) list 370.

Figure 4:
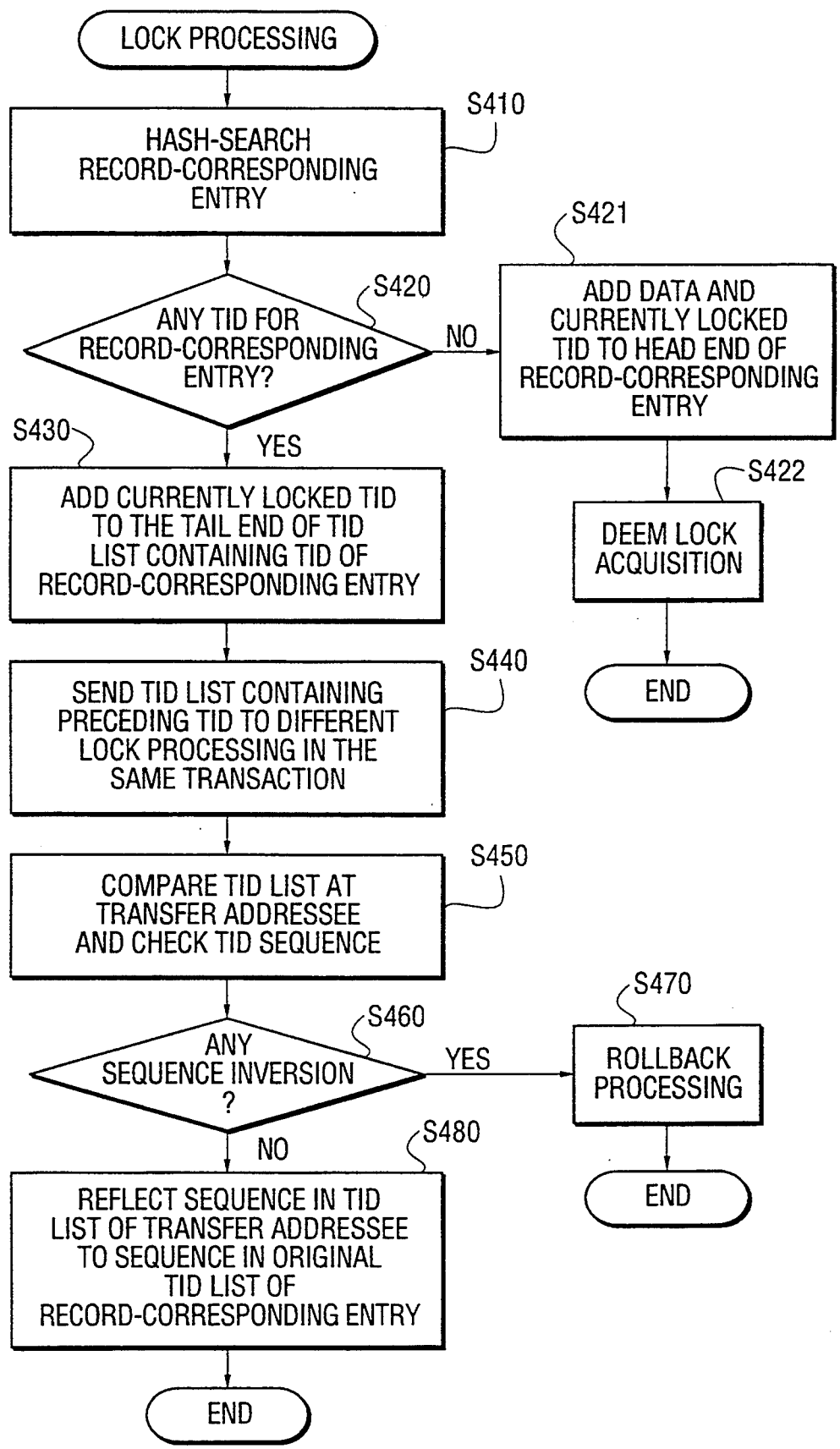
FIG. 4 is an operational flowchart of a lock processing.

FIG. 4 is an operational flowchart of a lock processing.

The following is a description of respective steps executed by the lock mechanism 360 after a lock processing starts.

S410: The lock mechanism 360 obtains an entry of a lock control table 100 included in the lock control table and TID LIST 370 from a target record by using an appropriate hash function. The process then continues to S420.

S420: The lock mechanism 360 judges whether or not the entry has any TID (transaction identifier). If the judgment is negative (NO), the process continues to S421. If the judgment is affirmative (YES), the process skips to S430.

S421: The lock mechanism 360 adds the currently locked TID to the head end of the entry obtained in S410. The process continues to S422.

S422: The lock mechanism 360 deems that a lock is acquired for the target record. The process ends.

S430: The lock mechanism 360 adds the current TID to the tail end of the TID list 110 containing a TID of the entry. The process then continues to S440.

S440: The lock mechanism 360 sends the TID list 110 containing preceding TIDs to a different lock processing in the same transaction 310 to confirm that a currently preceding TID is not succeeding in the TID list 110 of a different lock processing in the same transaction 310. The process then continues to S450.

S450: The lock mechanism 360 checks the transfer TID sequence with the TID sequence in the TID list 110 of the different lock processing, which is the transfer addressee in S440. The TID before the current TID is compared with the TID list of the lock processing (, for example, lock B) at the addressee. The process then continues to S460.

S460: The lock mechanism 360 judges whether or not a sequence inversion has occurred. If the judgment is affirmative, the process continues to S470. If the judgment is negative, the process skips to S480.

S470: The lock mechanism 360 performs a rollback processing, which will be described later. Then, the process ends.

S480:. The lock mechanism 360 reflects the sequence of TIDs in the TID list 110 at the transfer addressee to the sequence of TIDs in the original TID list 110 containing a TID of the entry corresponding to the target record. It is notified to the original lock processing (lock A, for example,) that the inversion of the sequence does not exist in the TID list of the transfer addressee. Then, the process ends.

When the entries of the lock control table 110 are manipulated, they must be locked at least individually.

The rollback processing in S470 is not performed for the entire transaction 310. Only the process portion relating to the record which causes the dead lock is rolled back. Thus, a record is actually rewritten after all the locks in a transaction are acquired. A synchronizer (synch) is introduced to hold the entire lock acquisition. When a cancellation comes before a control is received from the synchronizer (sync), a wait function (wait) for waiting for establishment of a synchronization is utilized to abandon data.

Figure 5:
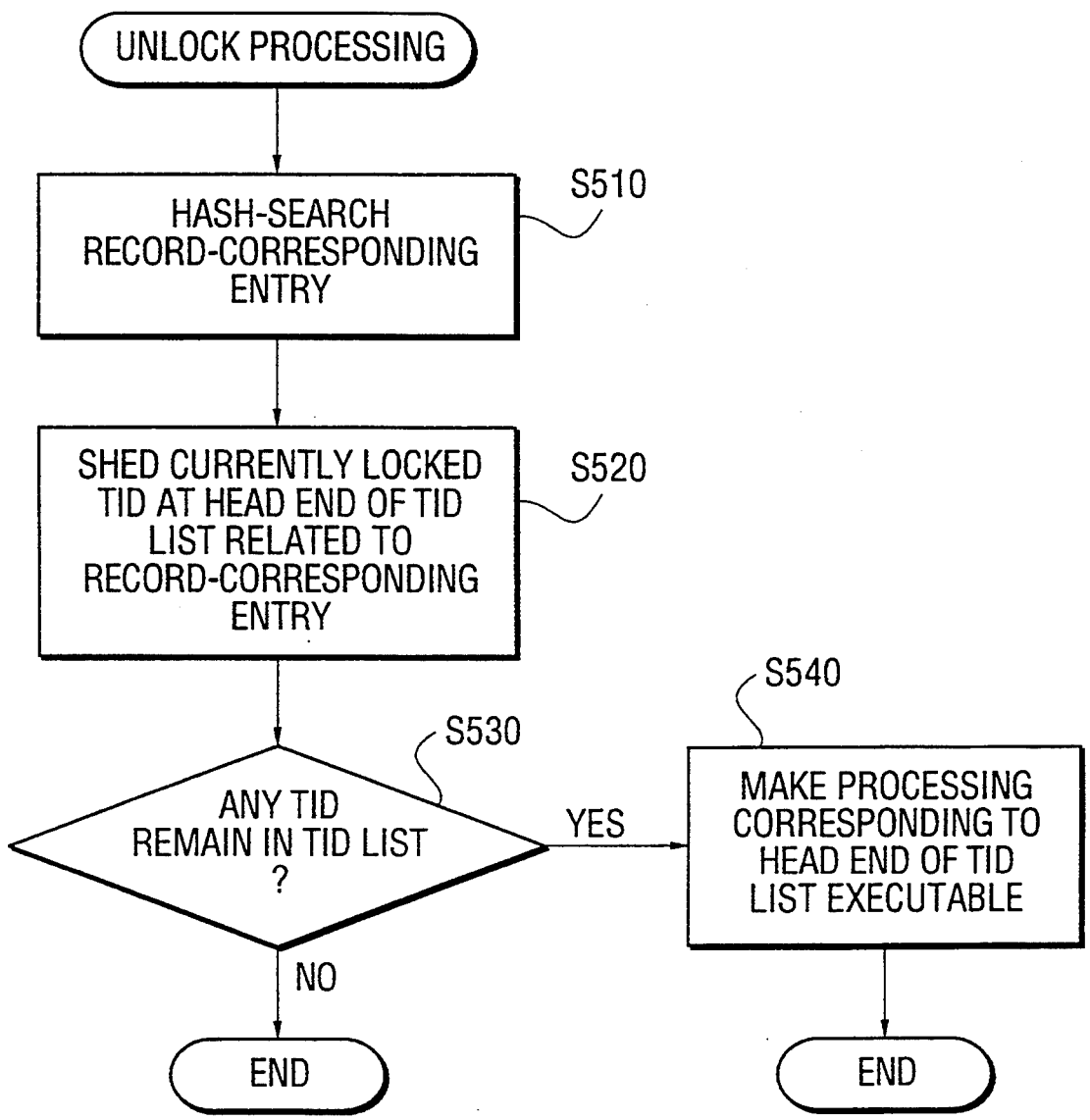
FIG. 5 is an operational flowchart of an unlock processing.

FIG. 5 is an operational flowchart of an unlock processing.

The following is a description of steps executed by the lock mechanism 360 after an unlock processing starts.

S510: The lock mechanism 360 obtains an entry of a lock control table 100 by using an appropriate hash function from a target record. The process then continues to S520.

S520: The lock mechanism 360 sheds the currently locked TID at the head end of the TID list 110 related to the record-corresponding entry.

S530: The lock mechanism 360 judges whether or not any TID remains in the TID list 110. If the judgment is negative (NO), the process ends. If the judgment is affirmative (YES), the process continues to S540.

S540: Because the transaction indicated by the TID waits to be unlocked, the lock mechanism 360 makes the head end transaction executable. Therefore, the TID list 110 has a pointer to the process made executable when the TID is at the head end. Then, the process ends.

A deadlock detection and the collateral rollback processing are explained by referring to the example shown in FIGS. 6 through 14, in which transactions 001 and 002 respectively update records A and B. The circles in FIGS. 6 through 14 represent processings and the dashed-line arrows between the circles express the directions of flow of data and controls in respective processing units.

FIG. 6 illustrates an initial state (1).

In the initial state (1), transactions 001 and 002, are divided into respective processing units and are used for processing records A and B, which are in a storer. First, transaction 001 receives record A, locks it, increments it by +30 and goes into a wait state. After replacing the processed result by record A, transaction 001 unlocks record A. The synchronizer (sync) in transactions 001 and 002, comprises a controller for establishing a synchronization, and requests a synchronization circuit (not shown) to execute a synchronization when a lock is applied to record A and record B. The sync controls the data-driving type synchronization circuit which is capable of releasing the wait function (wait) after the data are determined when lock processings (lock A and lock B) for record A and record B request the synchronization. A synchronization for unlocking (namely, unlock A and unlock B) is similarly established. In the initial state (1) shown in FIG. 6, the content of the lock control table 100 comprising pointers pointing to data and the TID list 110 is null. Record A and record B are stored in a storer comprising a memory.

FIG. 7 illustrates a state (2).

After a transition from the initial state (1), state (2) shows a state in which transaction 001 processes record A by chance. More specifically, the transaction 310 having TID 001 locks record A.

The transaction 310 having TID 001 searches an entry of the lock control table 100 through a hash operation. Assuming no entry is found, an entry is created. That is, 001 is put to the head end of the TID list. A data region of the lock control table 100 has a pointer to record A in the storer. A list region of the lock control table 100 has a pointer to a list element having TID 001, which is referred to as an elesmesnt or cell 001. Cell 001 comprises three [3] fields each storing TID 001, a pointer to the processing and a pointer to the next cell. The pointer for the next cell is NIL indicated by a slash ["/"] sign when the following cell does not exist.

Thus, when transaction 001 accesses record A by chance, cell 001 is connected to the lock control table 100. Thus, transaction 001 performs an exclusive control by locking record A such that record A is accessed by no other transaction. On locking record A, transaction 001 requests the synchronizer (sync) to establish a synchronization. However, a synchronization is not established unless the synchronizer (sync) of a processing controlling circuit for "lock B" has a synchronization request.

Figure 8:
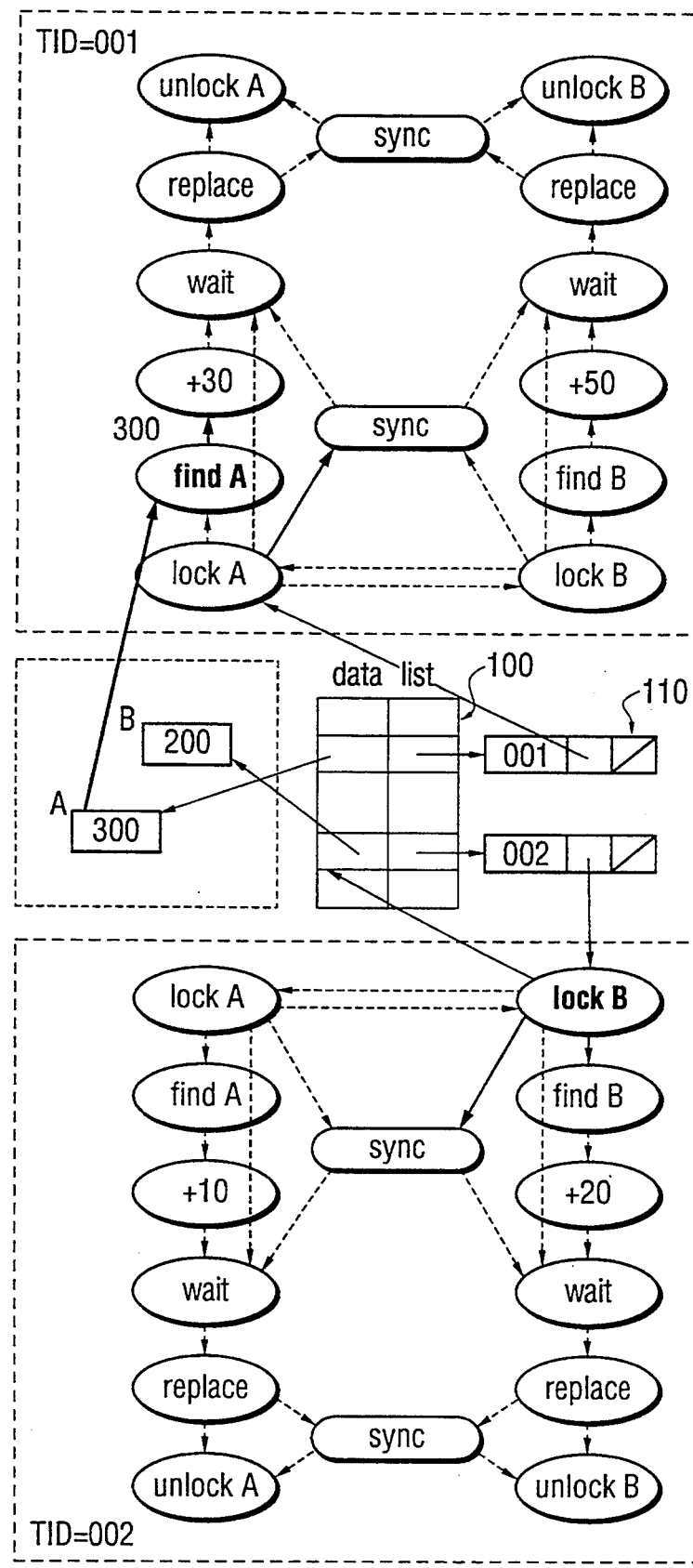
FIG. 8 illustrates a state (3)

FIG. 8 illustrates a state (3).

After a transition from state (2), state (3) shows a state in which transaction 001 accesses a memory circuit to find and read record A, thereby determining the content (which is three hundred [300]) of record A. More specifically, the transaction 310 having TID 001 locks record A. Assuming here that the processing is for adding thirty [30] to three hundred [300], transaction 001 hands three hundred [300] in record A over to an adding processor.

Assume that transaction 002 happens to make a processing request to record B this time. Thus, because the transaction 310 having TID 002 is concurrently executable, transaction 002 tries to acquire a lock for record B. Furthermore, because record B is not locked anywhere, transaction 002 acquires a lock. That is, an entry of record B in the lock control table 100 causes the data region to store a pointer for accessing a region having record B (which is two hundred [200]) and the head end of the list region to store cell 002 for storing a pointer for accessing the processing for record B performed after transaction 002. Then, transaction 002 requests the synchronization controller sync to enable a synchronization by performing "lock B" for performing an exclusive control for record B after cell 002 is created. In this case, transactions 001 and 002 are processed contemporaneously.

Figure 9:
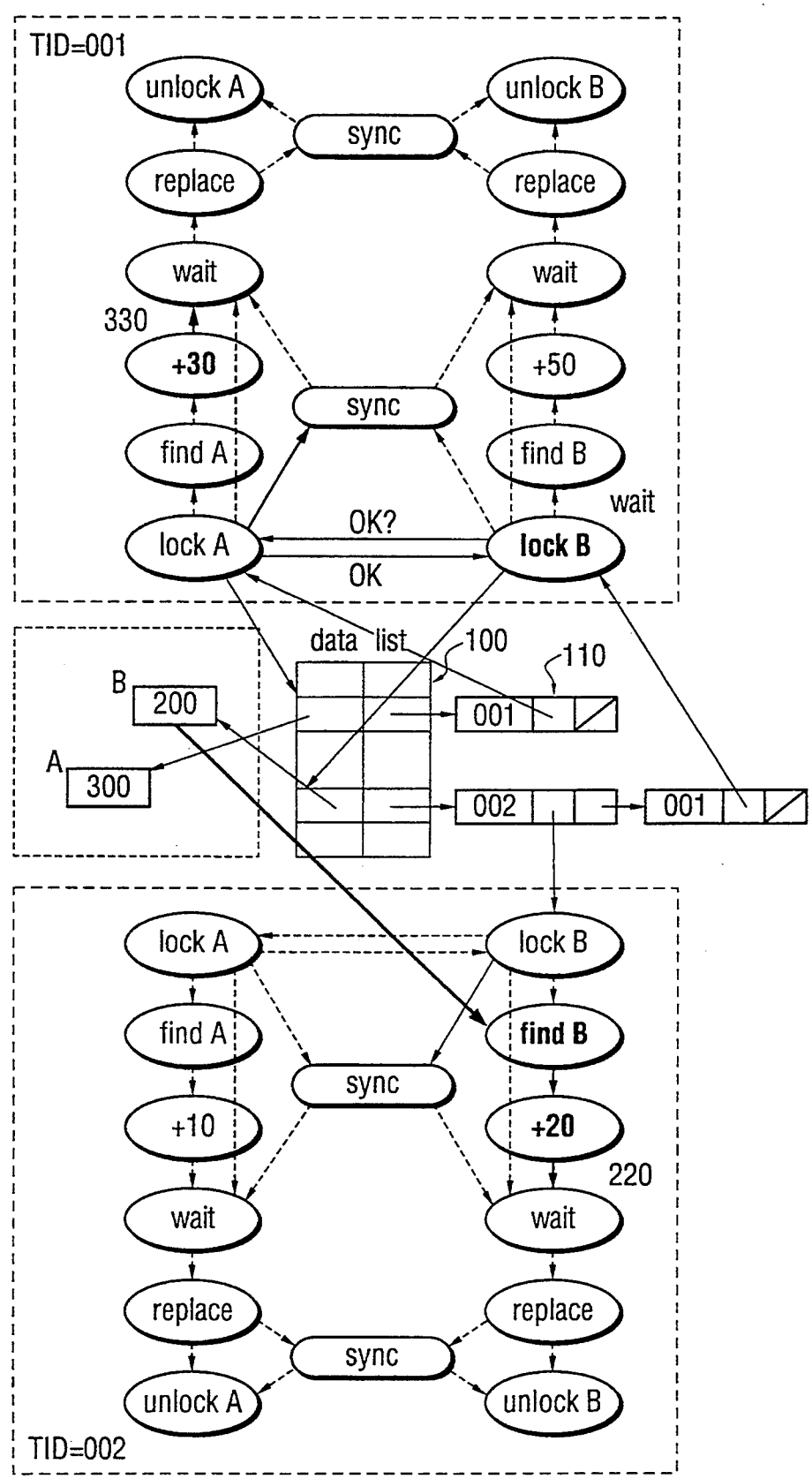
FIG. 9 illustrates a state (4)

FIG. 9 illustrates a state (4).

After the transition from state (3), state (4) shows that transaction 002 still continues the processing for record B. That is, transaction 002 performs "find B" to find record B, which is two hundred [200], and adds twenty [20] to it. After obtaining the sum two hundred twenty [220], transaction 002 goes into a wait state.

In the mean time, transaction 001 adds thirty [30] to record A, which is three hundred [300] to produce a sum three hundred thirty [330]. Record A is then put into a wait state. These updated values are not written into the storer unless all locks in transactions 001 and 002 are unlocked. Assume that the transaction 310 having TID 001 happens to request an access to record B in parallel with those processings.

As shown in FIG. 9, the head end cell of the TID list 110 corresponding to record B of the lock control table 110, i.e. the third field of cell 002 corresponding to transaction 002 is changed from nil to the pointer to the next cell 001 corresponding to transaction 001. This is because transaction 002 processes record B, and transaction 002 locks record B. Unless transaction 002 performs an "unlock B" to unlock the locks, transaction 001 is put into a wait state without processing record B, even though transaction 001 requests a processing for record B. That is, processing for record B in transaction 001 is put into a wait state.

At the same time, transactions 001 and 002 confirm whether or not a foreign TID list 110 contains the transaction with the same TID numbers, included in the current TID list 110. In this case, because the same transaction 310 locks record A only, and because the TID list 110 contains only cell 001, a deadlock does not happen.

Figure 10:
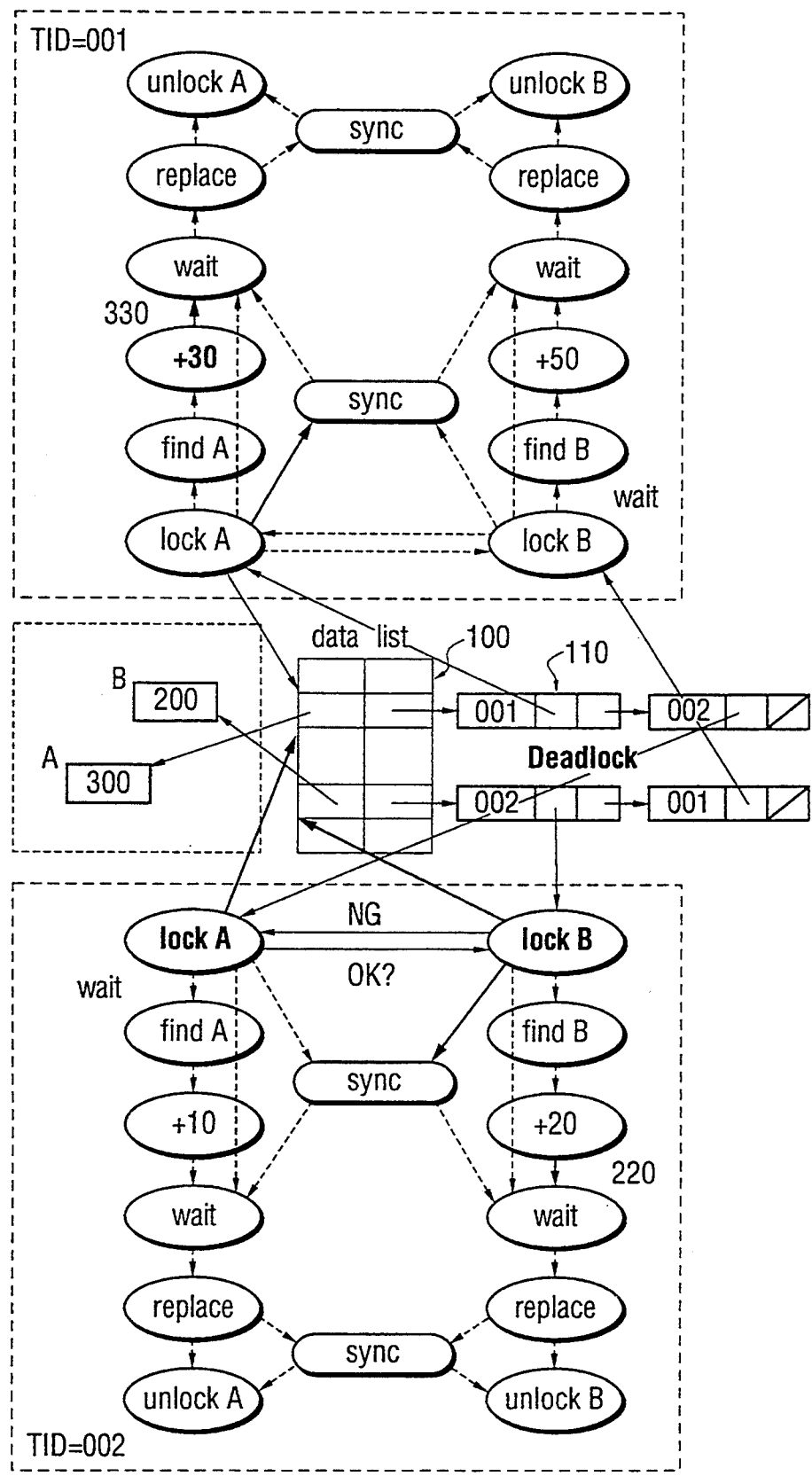
FIG. 10 illustrates a state (5)

FIG. 10 illustrates a state (5).

After the transition from state (4), state (5) shows that the transaction 310 having TID 002 happens to start a lock acquisition processing for record A. Then, because the TID list 110 for record A in the lock control table 110 performs a processing for record A, and is not yet to be unlocked, in the third field of the cell concerning transaction 001 is changed from the nil state to the state in which pointer to the cell 002 is stored in the third field, such that cell 002 succeeds cell 001. Because the TID list 110 for record A puts cell 001 before cell 002 and the TID list 110 for record B puts cell 002 before cell 001, a sequence inversion occurs, which causes a deadlock.

That is, when transaction 001 uses record A, transaction 002 uses record B, and then, transaction 001 further requests record B, transaction 002 further requests record A, transaction 001 does not unlock record A unless transaction 002 unlocks record B, and transaction 002 does not unlock record B unless transaction 001 unlocks record A. Thus, transaction 001 waits for transaction 002 to unlock record B, while transaction 002 waits for transaction 001 to unlock record A.

It becomes sufficient to find a sequence inversion, i.e. a state in which cell 002 succeeds cell 001 in the TID list 110 for record A, and cell 001 succeeds cell 002 in the TID list 110 for record B, to enable the deadlock to be mechanically recognized.

Thus, during the transition from state (4) shown in FIG. 9 to state (5) shown in FIG. 10, i.e. when a pointer of cell 001 points to cell 002 in a list for record A, it is confirmed whether or not a pointer has already assigned cell 001 after cell 002. That is, it is confirmed whether or not record A on the left hand side of transaction 002 is behind record B on the right hand side of transaction 002, by checking whether or not cell 001 (having the TID of the cell preceding 002 on the TID list 110 for record A) is behind cell 002 in some other region of the lock control table 110, by a controlling means "lock B" for processing flow pointed by cell 002 at the head end assigned to record B. This is an "OK?" arrow, meaning a confirmation of whether or not it is OK. In this case, because a check of the content of the lock control table 100 by a hash function reveals that cell 001 is assigned after cell 002, a circuit for controlling "lock B" emits an NG (No Good) signal, indicating a deadlock, to a circuit for controlling "lock A". This is what an NG signal means for an "OK?" arrow.

Figure 11:
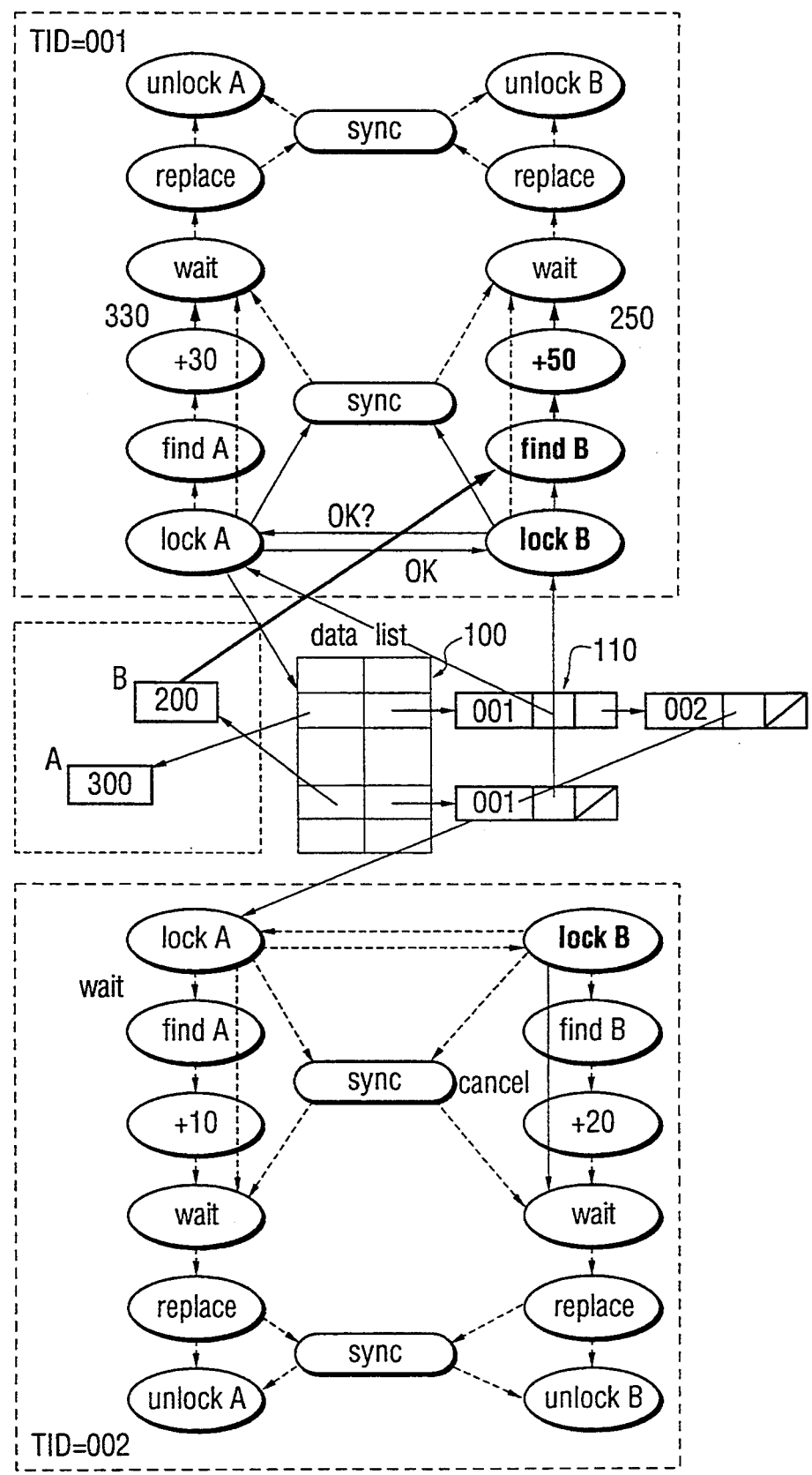
FIG. 11 illustrates a state (6)

FIG. 11 illustrates a state (6).

After the transition from state (5), state (6) shows that a rollback processing starts. A rollback processing cancels the processing for record B in transaction 002 by emitting an NG signal.

First, a datum having a value two hundred twenty [220], which is an input of the wait function (wait), is canceled, and cell 002 is removed from the TID list 110 for record B. This causes cell 001 to come to the head, which is shown as state (6) in FIG. 11. Then, an existence of a deadlock is checked, again, in this state.

That is, "lock B" performing transaction 00i asks a controlling circuit for processing record A of transaction 001 to confirm whether or not the cell, (none in this case) provided, before cell 001 in the region relating to record B is connected behind cell O01 in some other region of the lock control table 100, for example, in the region relating to record A. Because such a TID does not exist, "lock A" gives "lock B" an answer "OK" in response to an inquiry "OK?". Since there is no deadlock, a further processing is executed. Then, transaction 001 adds fifty [50] to the datum of record B, which has a value two hundred [200], (not two hundred twenty [220].)

Figure 12:
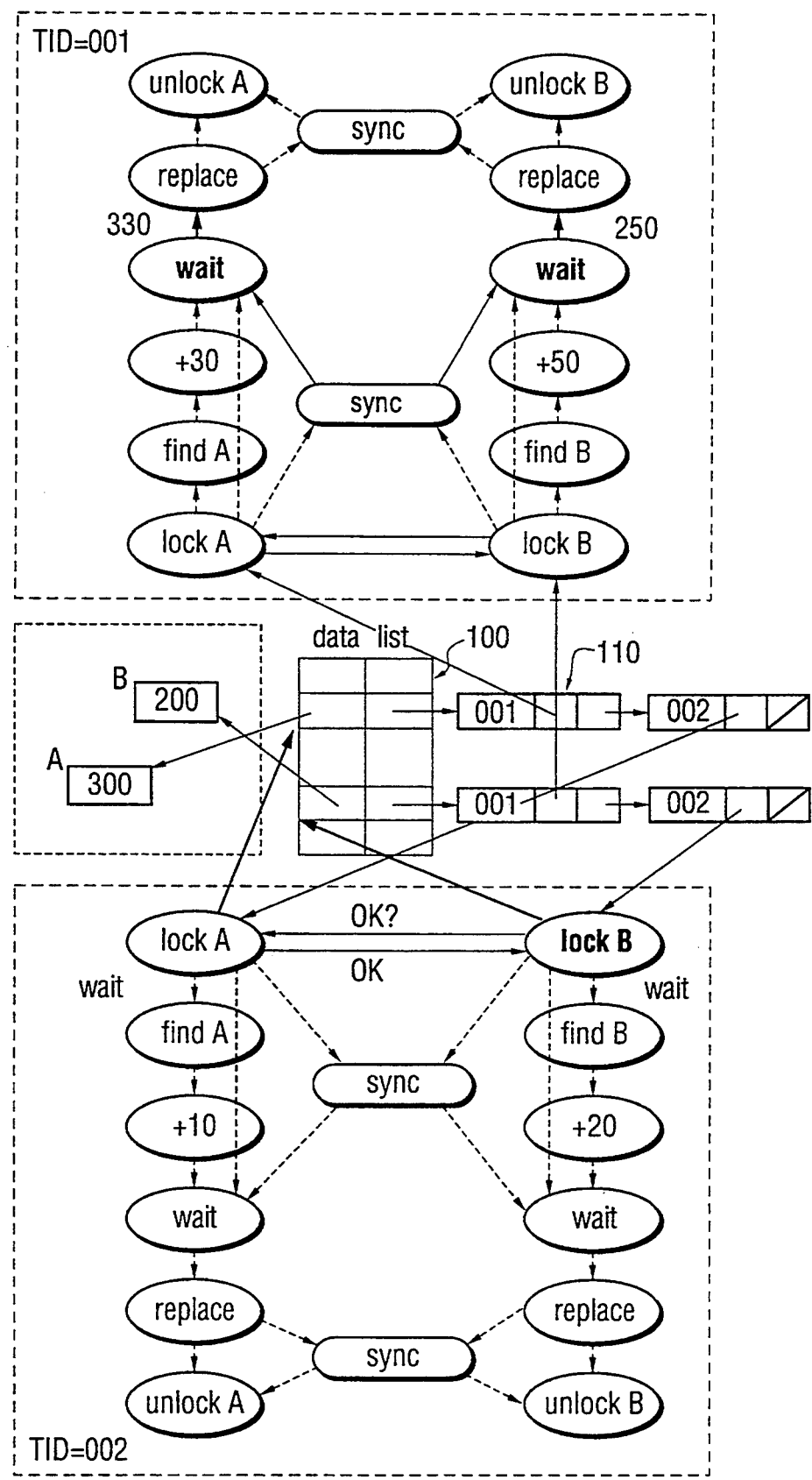
FIG. 12 illustrates a state (7)

FIG. 12 illustrates a state (7).

After the transition from state (6), state (7) shows that because transaction 001 (TID being 001) succeeds in locking both records A and B, the synchronizer (sync) is turned on for synchronization. The output of the synchronizer causes the data three hundred thirty [330] and two hundred fifty [250] kept in a wait state to be handed over to a rewrite processing. That is, it becomes possible to release records A and B from a wait state.

Transaction 002 (TID being 002) resumes a lock processing for record B, which has been rolled back. In this case, too, since the TID list 110 has already accepted a foreign TID (for cell 001), although both records A and B are in a wait state, detect processing for their deadlocks commences contemporaneously. That is, it is confirmed whether or not cell 001 precedes cell 002, and for record A in transaction 002 having the same cell 002, whether or not cell 001 succeeds cell 002. Because cell 001 is not connected and there is no sequence inversion, there is no deadlock. Hence, the controlling circuit for "lock A" gives the controlling circuit for "lock B" an "OK" signal in response to an "OK?" inquiry.

Figure 13:
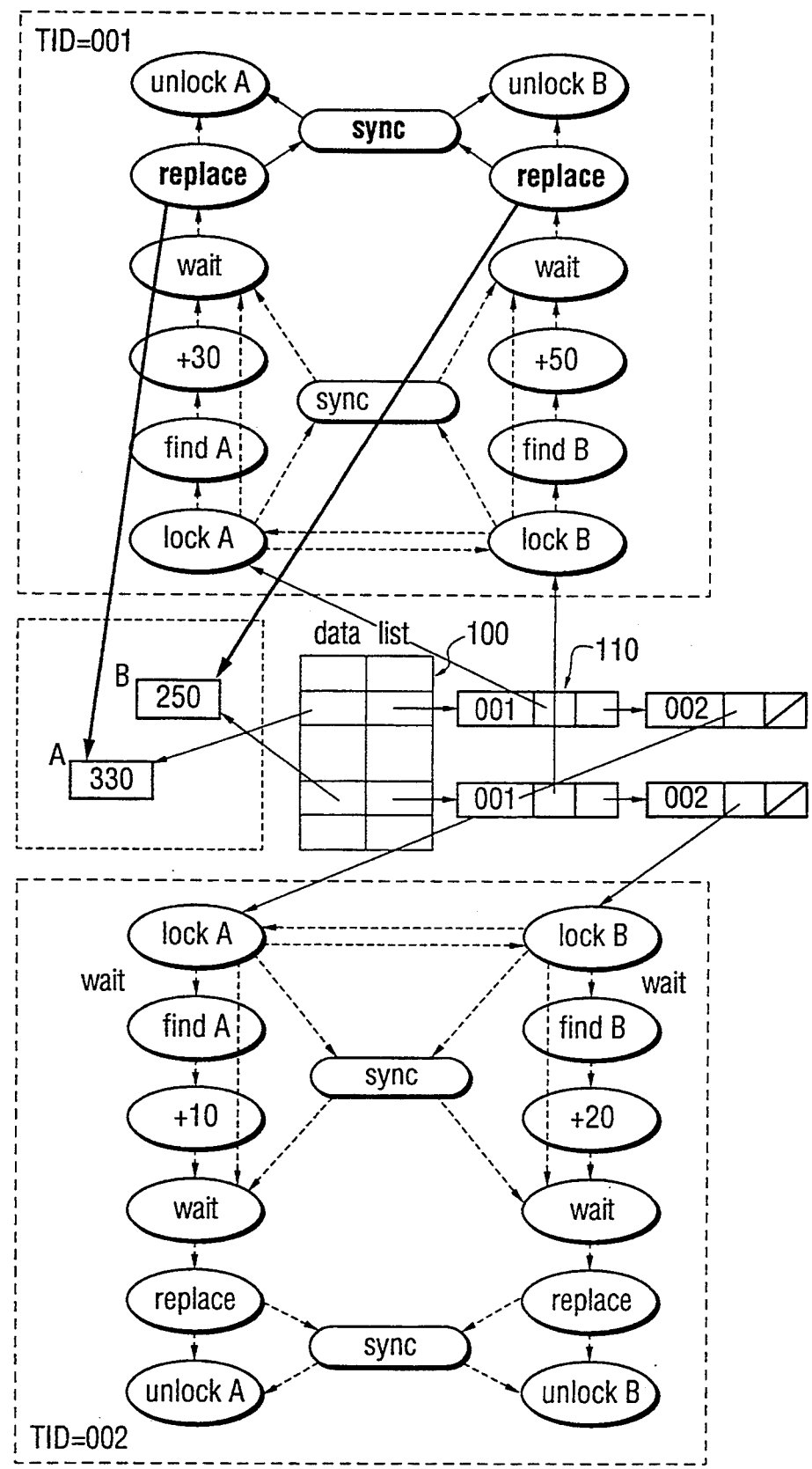
FIG. 13 illustrates a state (8)

FIG. 13 illustrates a state (8).

After the transition from state (7), state (8) shows that transaction 001 (TID being 001) rewrites records A and B and the synchronizer (sync) synchronizes the completions of their rewrite processings. This is to allow a recovery in case of an emergency during a rewrite processing. If both rewrite processings end without a problem, the storer writes the sums three hundred thirty [330] and two hundred fifty [250], which are the results of operations for records A and B.

Figure 14:
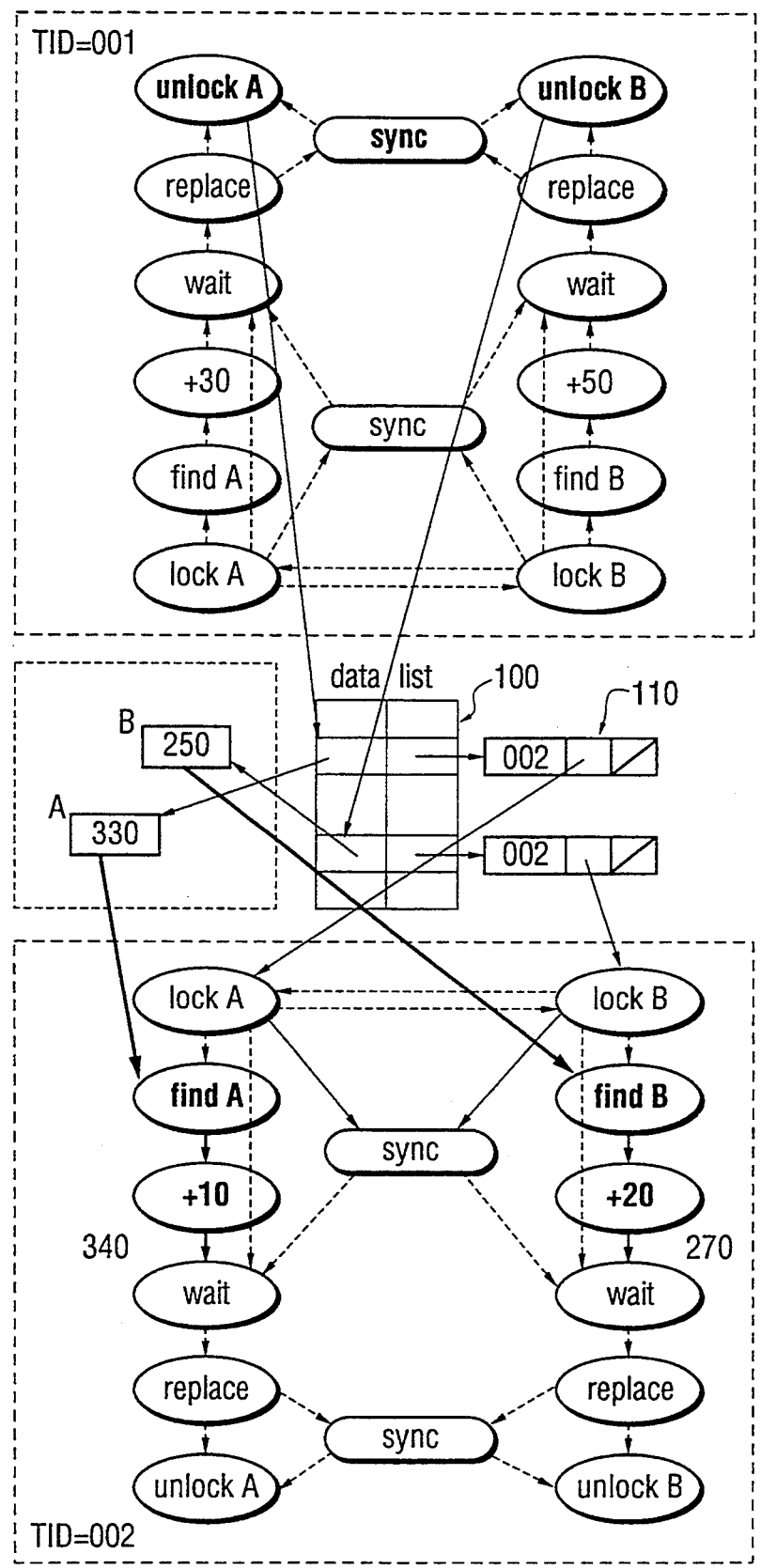
FIG. 14 illustrates a state (9)

FIG. 14 illustrates a state (9).

After the transition from state (8), state (9) shows that records A and B are unlocked. The head end cell in the lock control table 100 disappears, and the operations for transaction 002 are executed for both records A and B. That is, additions for record A: 330+10=340
for record B: 250+20=270 are executed. When each of those sums, three hundred forty [340] and two hundred seventy [270], are obtained, transaction 002 puts processings for records A and B into a wait state. However, because their data are complete, the newly obtained sums replace the currently outstanding sums, and transaction 002 unlocks records A and B.

The processes shown in FIGS. 6 through 14 enable both transaction 001 and transaction 002 to execute processings for records A and B.

Figure 15:
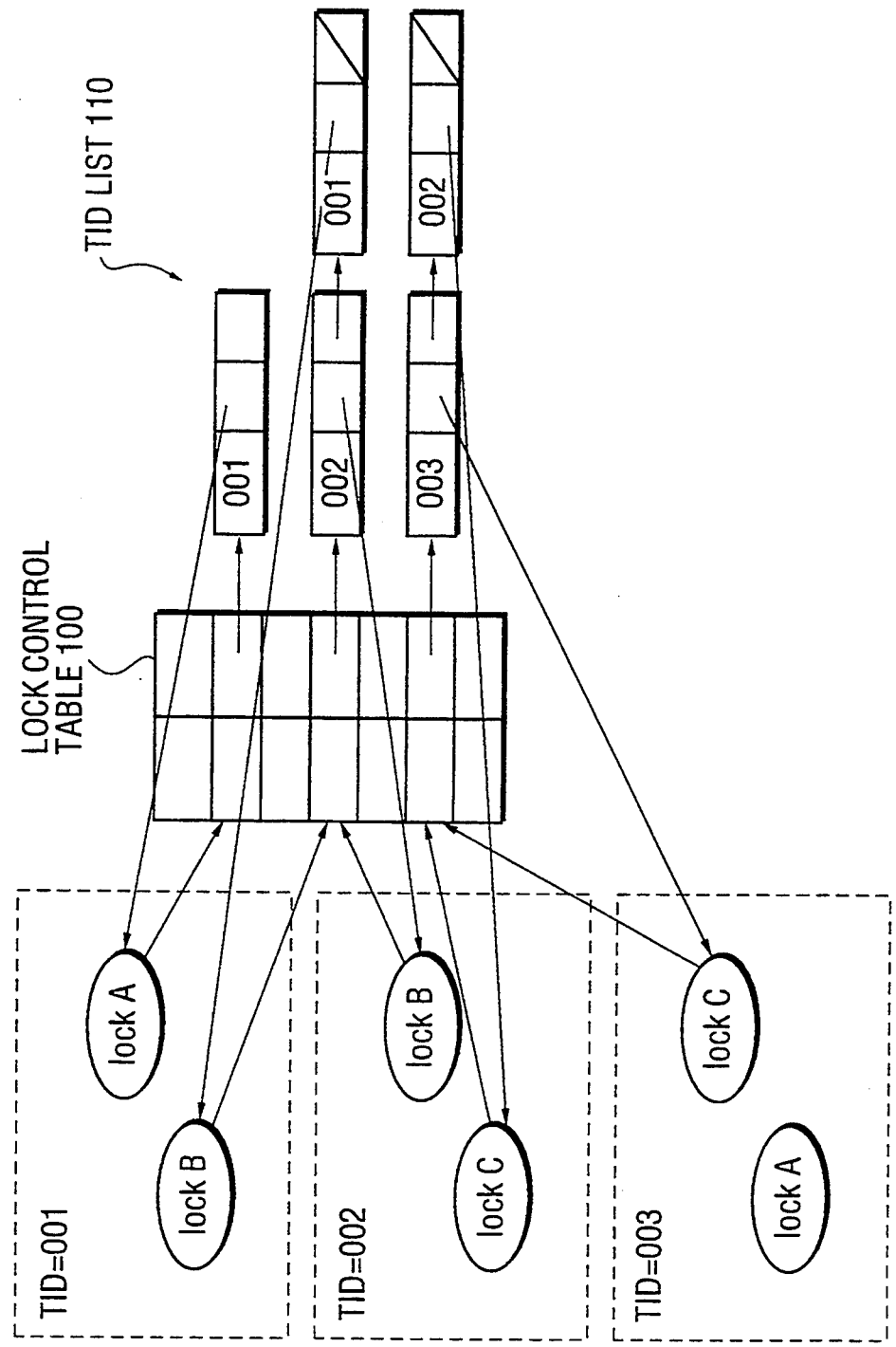
FIG. 15 illustrates a triple stalemate.

FIG. 15 illustrates a triple stalemate.

There also are cases in which more than two [2] transactions cause a deadlock. In such cases, a mere examination of a sequence inversion within the TID list 110 of a record relevant to a particular transaction 310 by simply connecting the cells in a transaction directly requesting a record to a TID list may not reveal a deadlock.

As shown in FIG. 15, although a connection of the TID list 110 of TID 003 to the entry of record A in lock control table 100 causes a deadlock, a mere examination of the TID list 110 of the record utilized by these transactions does not enable the deadlock to be detected.

However, it is still possible to detect a deadlock, even in a case like this in which a triple stalemate occurs, if respective transactions transfer their TIDs and the transferees cannot detect a sequence inversion, by reflecting the sequences of the TID list 110 of the transferee to the TID list 110 having the entry of the record.

Figure 16:
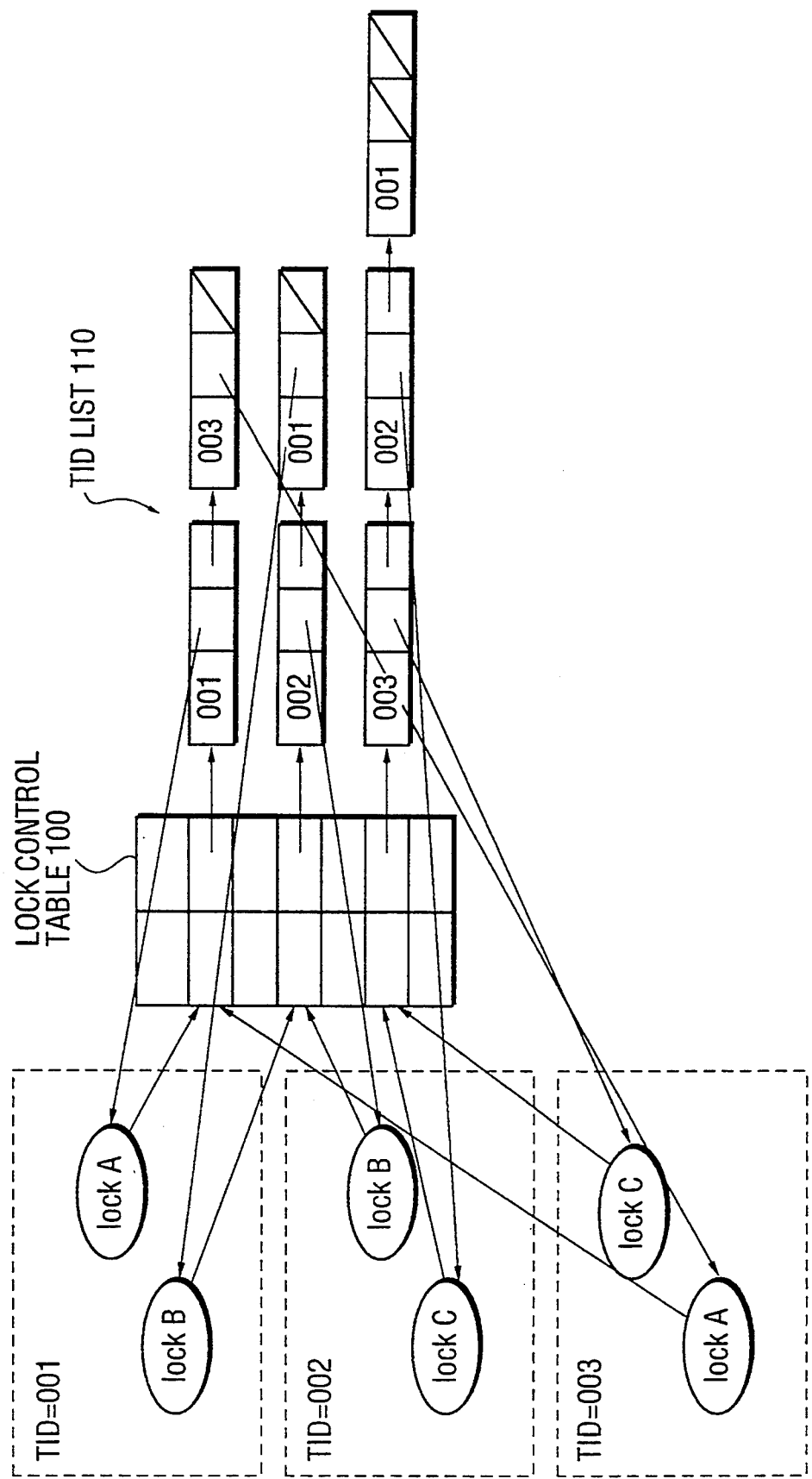
FIG. 16 illustrates a deadlock detection in a triple stalemate.

FIG. 16 illustrates a deadlock detection in a triple stalemate.

An example of a deadlock detection is explained below, by referring to the case shown in FIG. 15. Transaction 002 (TID being 002) requests record C to be locked and transfers TID 003 to "lock B", a lock processing for record B. To reflect the sequential relation of TID 002 and TID 001 to the entry of record C, cell 001 is connected behind cell 002, as shown in FIG. 16. This enables transaction 003 (TID being 003) to detect a deadlock. A pointer (a second region of a cell) of the processing to be executed when the currently attached cell comes to the head and the end is made nil.

When cell 001 does not happen to be connected to an entry of record B, nothing is performed during a deadlock detection processing for TID 002. Because TID 002 is inserted in an entry of record A before TID 001 after TID 001 requests record B, a deadlock is detected when TID 003 requests record A.

Figure 17:
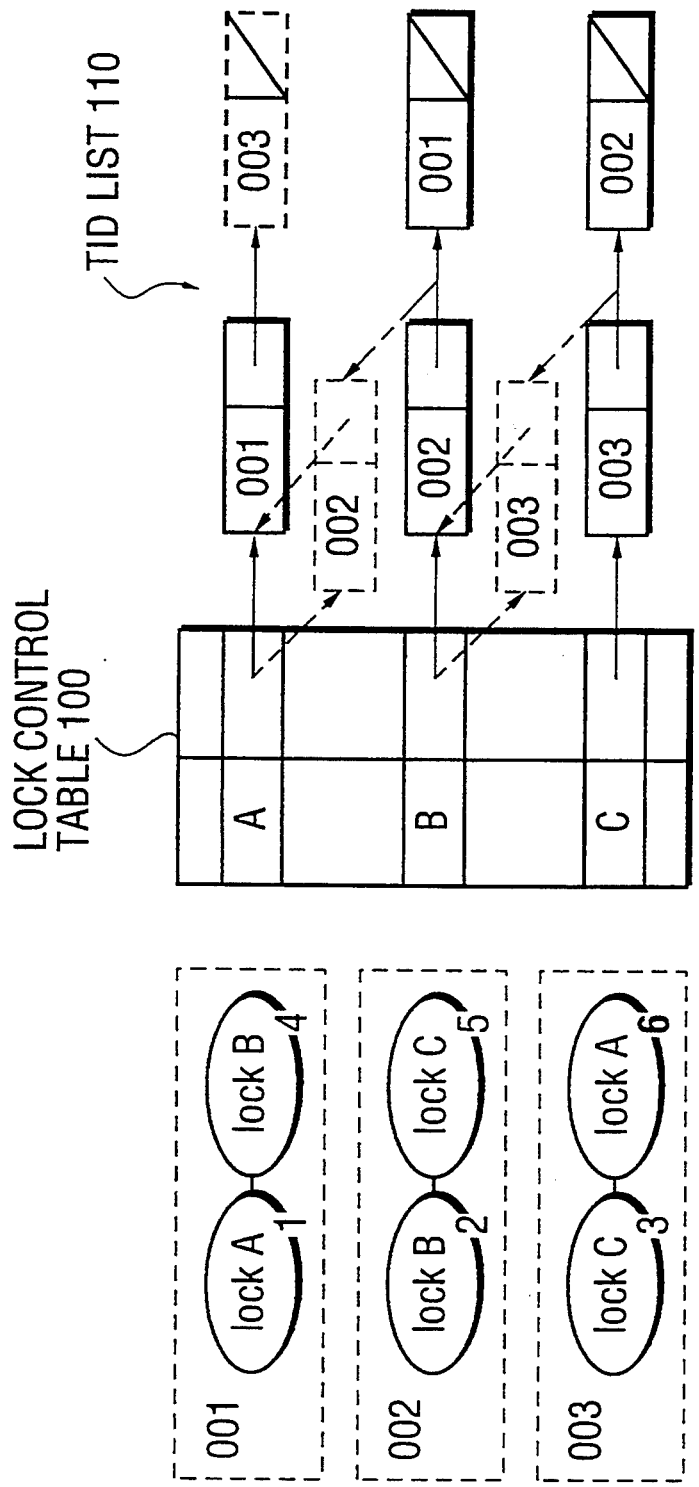
FIG. 17 illustrates a derivative form of a triple stalemate.

FIG. 17 illustrates a derivative form of a triple stalemate.

Assume here the following situation. Currently, transaction 001 accesses record A, transaction 002 accesses record B and transaction 003 accesses record C. Later, transaction 001 happens to request an access to record B, and transaction 002 happens to request an access to record C.

Then, transaction 001 cannot process record B, unless transaction 002 unlocks record B. Similarly, transaction 002 cannot process record C, unless transaction 003 unlocks record C. That is, at this time, transactions 001 and 002 wait for records B and C to be unlocked.

Further, in the above wait state, when transaction 003 happens to request an access to record A again, transaction 003 must wait for transaction 001 to unlock record A. Then, transaction 001 must wait for transaction 002 to unlock record B, Transaction 002 in turn must wait for transaction 003 to unlock record C, Further, transaction 003 must wait for transaction 001 to unlock record A. This represents a deadlock in a triple-stalemate case.

Figure 18:
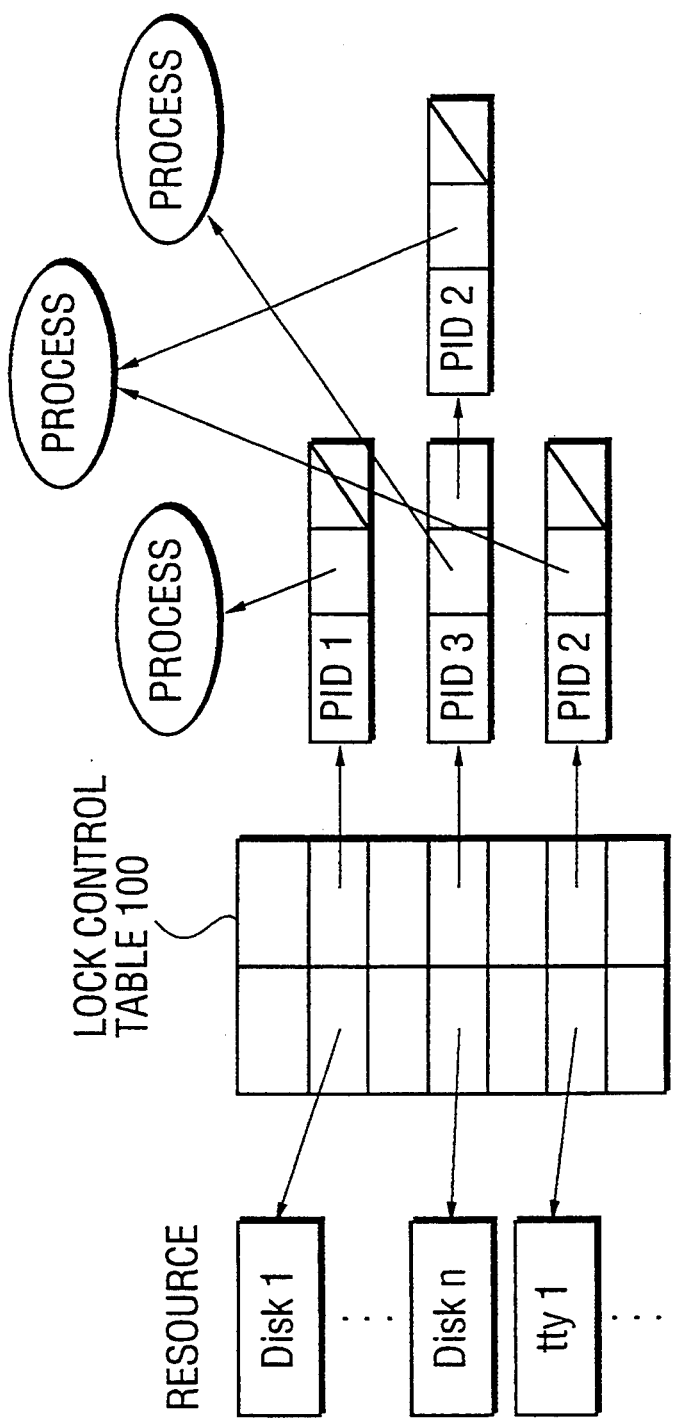
FIG. 18 illustrates a preferred embodiment of this invention for managing an OS resource.

In a situation like this, unlike in a case in which two transactions form a deadlock, a mere examination of a sequence inversion of TID cells does not allow a deadlock to be detected. Therefore, a dummy cell is inserted as shown in FIG. 17. That is, one of the pointers in FIG. 17 assigns cell 002 to the head end of the TID list of lock control table 370 for record A, and another assigns cell 003 to the head end of the TID list of lock control table 370 for record B. When cell 003 is attached to the head end of the TID list 110 connected to control table 110 for record A, for example, this arrangement allows the same transaction, i.e. transaction 003, to check whether or not the cell connection preceding transaction 003 for record A, i.e. a connecting relation between transactions 002 and 001, is behind transaction 003. In this case, because record B has a connection between transactions 002 and 001 after transaction 003, it becomes possible to detect a deadlock. FIG. 18 illustrates a preferred embodiment of this invention for managing an OS resource.

The deadlock detection system of this invention is applicable not only to a resource utilization by a transaction but also to that by a process in an OS.

As a resource, a memory (page address), a processor, an I/O device, etc. are provided as entries in the lock control table 370. Process IDs (PIDs) are connected in a list form as resource requester identifiers. The list contains a pointer for pointing the process made executable when a particular PID comes to the head end, as with the earlier described embodiment about transactions. The lock and unlock procedures are the same as that a record is changed to a resource and a TID is changed to a PID.

Figure 19:
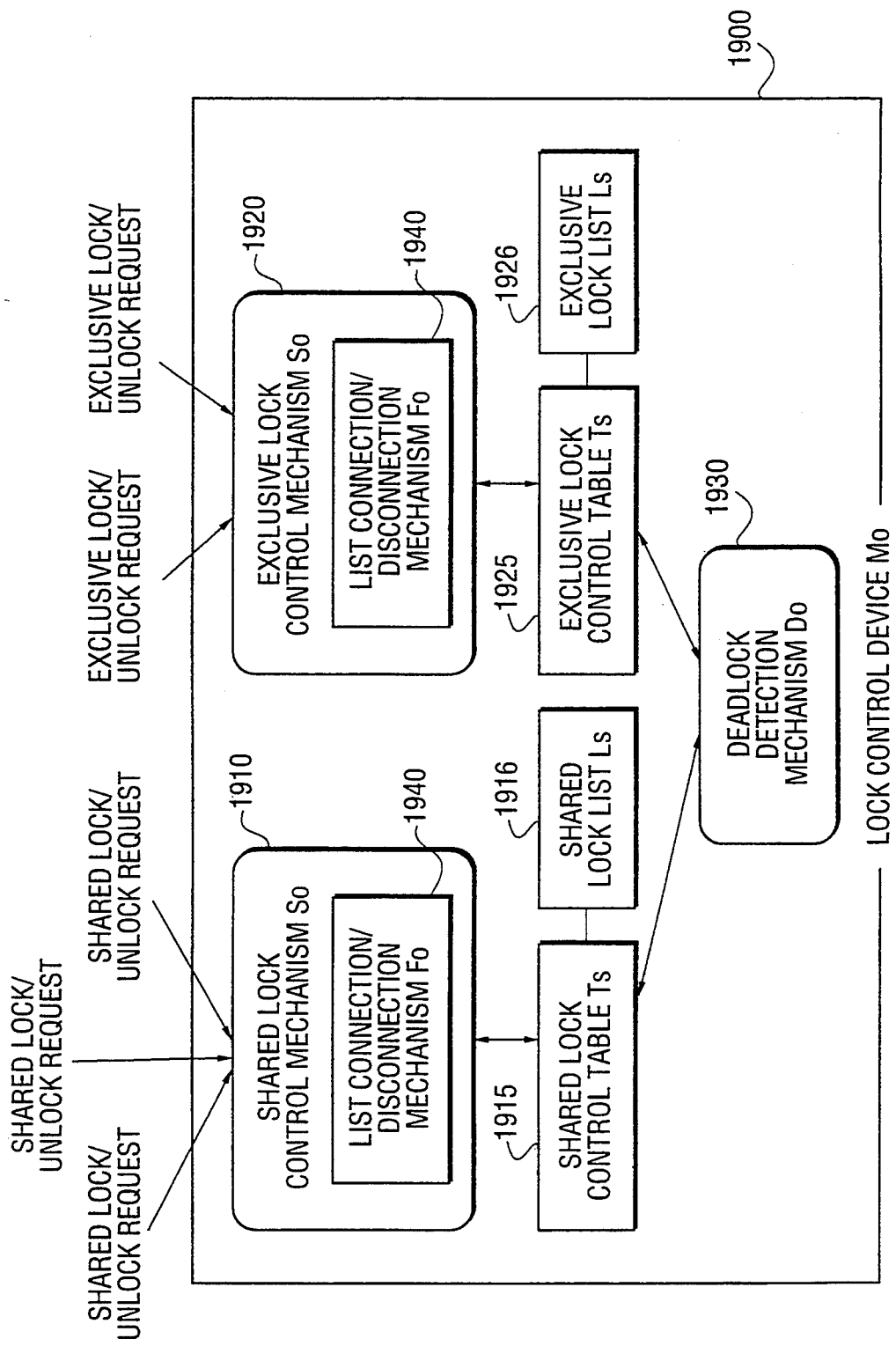
FIG. 19 shows a system configuration of a lock control device for separately controlling a shared lock and an exclusive lock.

FIG. 19 shows a system configuration of a lock control device for separately controlling a shared lock and an exclusive lock.

Although the only kind of locks the lock control methods described above can handle is exclusive locks, there is another kind of locks called shared locks. A shared lock is defined as a lock capable of sharing a resource such as "read". A shared lock allows an increase in the number of processings to be simultaneously executed by competing resource requesters.

A generic method of handling both an exclusive lock and a shared lock is to control them separately. That is, an exclusive lock and a shared lock have their own lists connected to their distinct lock control tables. In this case, a deadlock detection is executed after respective lock contents are grouped by transaction.

A lock control device 1900 comprises a shared lock control mechanism So 1910 having a shared lock control table Ts 1915 connected with a list of shared locks Ls 1916 and an exclusive lock control mechanism Eo 1920 having an exclusive lock control table Te 1925 connected with a list of exclusive locks Le 1926. Both the shared lock control mechanism So 1910 and the exclusive lock control mechanism Eo 1920 own a list connection/disconnection function Fo 1940. A deadlock detection mechanism Do 1930, which is independent of these control mechanisms, detects a deadlock by referring to both the shared lock control table Ts 1915 and the exclusive lock control table Te 1925.

Because this system does not directly use entries of the lock control table 100 in detecting a deadlock, a phantom lock, which is prevented by deadlock detection methods shown in FIGS. 3 and 18, can not be avoided.

Thus, it is conceived to have a single control table control both an exclusive lock and a shared lock. In this case, a list connected to a single entry has both an exclusive lock and a shared lock in a mixed form. They need to be distinguished in some manner, such as by using a tag. Here, since a shared lock can supply resources to a plurality of resource requesters when no exclusive lock is effective, no more than one [1] shared lock appears in a list connected to a single entry. When an exclusive lock request comes after a shared lock and then an exclusive lock request comes again, a shared lock further comprises a list to which a subsequent request is added.

For example, assume that r(x) represents a case in which a shared lock comes from a resource requester idx, and that w(y) represents a case in which an exclusive lock comes from a resource requester idy.

When a resource A receives a request in a sequence:

$$r(1) \to w(2) \to r(3) \to w(4) \to r(5)$$

a list connected to an entry of a lock control table for the resource A becomes A: [r{1,3,5}, w{2}, w{4}.].

When a resource B receives a request in a sequence:

$$w(1) \to r(2) \to r(3) \to r(4) \to w(5)$$

a list connected to an entry of a lock control table for the resource B becomes B: [w{1}, r{2,3,4}, w{5}].

The exclusive lock request by w(2) for the resource A is acquired by id2 after processings for id1, 3, 5 are finished and a shared lock is unlocked.

Here, a deadlock is detected from a sequence inversion among elements of a list connected to an entry, each time a lock is requested. Here, because a shared lock has a list in a list, its treatment needs to be further analyzed. Here, lists broken down from a list of a shared lock are treated as different lists in detecting a deadlock.

That is, a list A: [r{1,3,5}, w{2}, w{4}] is broken down to the following three [3] lists when a deadlock is detected.

A': [r{1}, w{2}, w{4}]

A': [r{3}, w{2}, w{4 }]         (1)

A": [r{5}, w{2}, w{4}]

Similarly, a list B: [w{1}, r{2,3,4}, w{5}] is locally broken down to the following three [3] lists when a deadlock is detected.

B': [w{1}, r{2}, w{5}]

B": [w{1}, r{3}, w{5}]         (2)

B"': [w{1}, r{4}, w{5}]

At this time, the list connected to an entry of a lock control table remains intact. Namely, the above breaking operation is performed by CPC to detect the deadlock and thus, the list structure connected to the lock control table is not changed.

For detecting a deadlock, a sequence inversion is detected from among the broken down lists. In this example, since r(5) and w(4) of A" and r(4) and w(5) of B" have a sequence inversion, a deadlock is detected.

A deadlock detection such as the above can be done in parallel by providing lock control devices for respective resource requests. The same lock control devices are provided for respective resource requests irrespective of whether the lock is a shared lock or an exclusive lock, such that a list connected to a single lock control table is broken down into the list elements of a shared lock. A deadlock is detected through the mutual communications of list elements.

Figure 20:
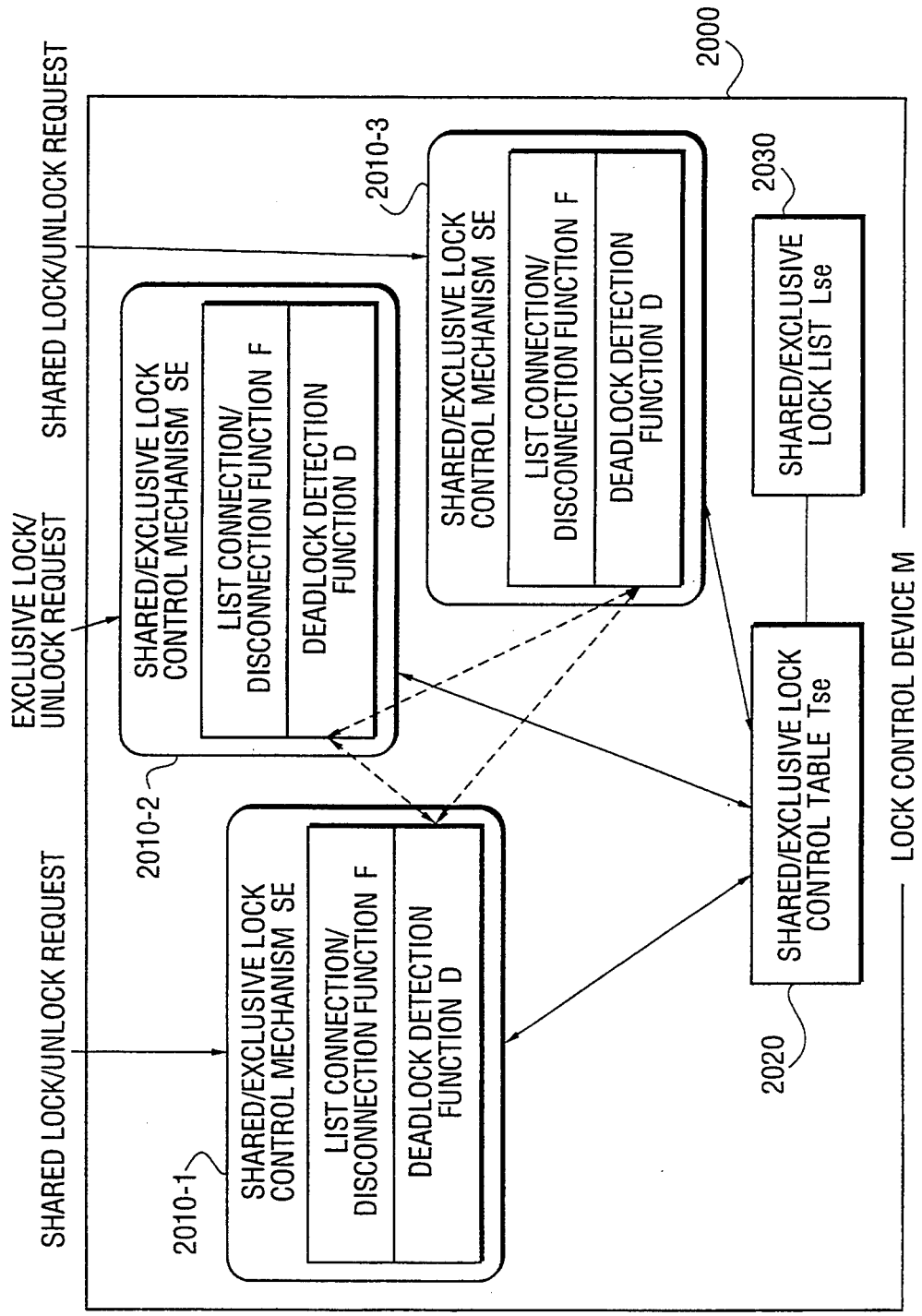
FIG. 20 shows a system configuration of a lock control device for Jointly controlling a shared lock and an exclusive lock.

FIG. 20 shows a system configuration of a lock control device for Jointly controlling a shared lock and an exclusive lock, A lock control device M 2000 comprises a plurality of shared/exclusive lock control mechanisms SE 2010 (2010-1, 2010-2, 2010-3, . . . ), a shared/exclusive lock control table Tse 2020, and a shared/exclusive lock list Lse 2030 connected to the shared/exclusive lock control table Tse 2020. As with the earlier described device (such as, one shown in FIG. 19 ), a list connection/disconnection function F 2015 is within respective shared/exclusive lock control mechanisms SE 2010. A deadlock detection function D 2016 is also included in respective shared/exclusive lock control mechanisms SE 2010. This configuration enables a deadlock to be detected-in parallel and a phantom deadlock generation to be prevented.

Figure 21:
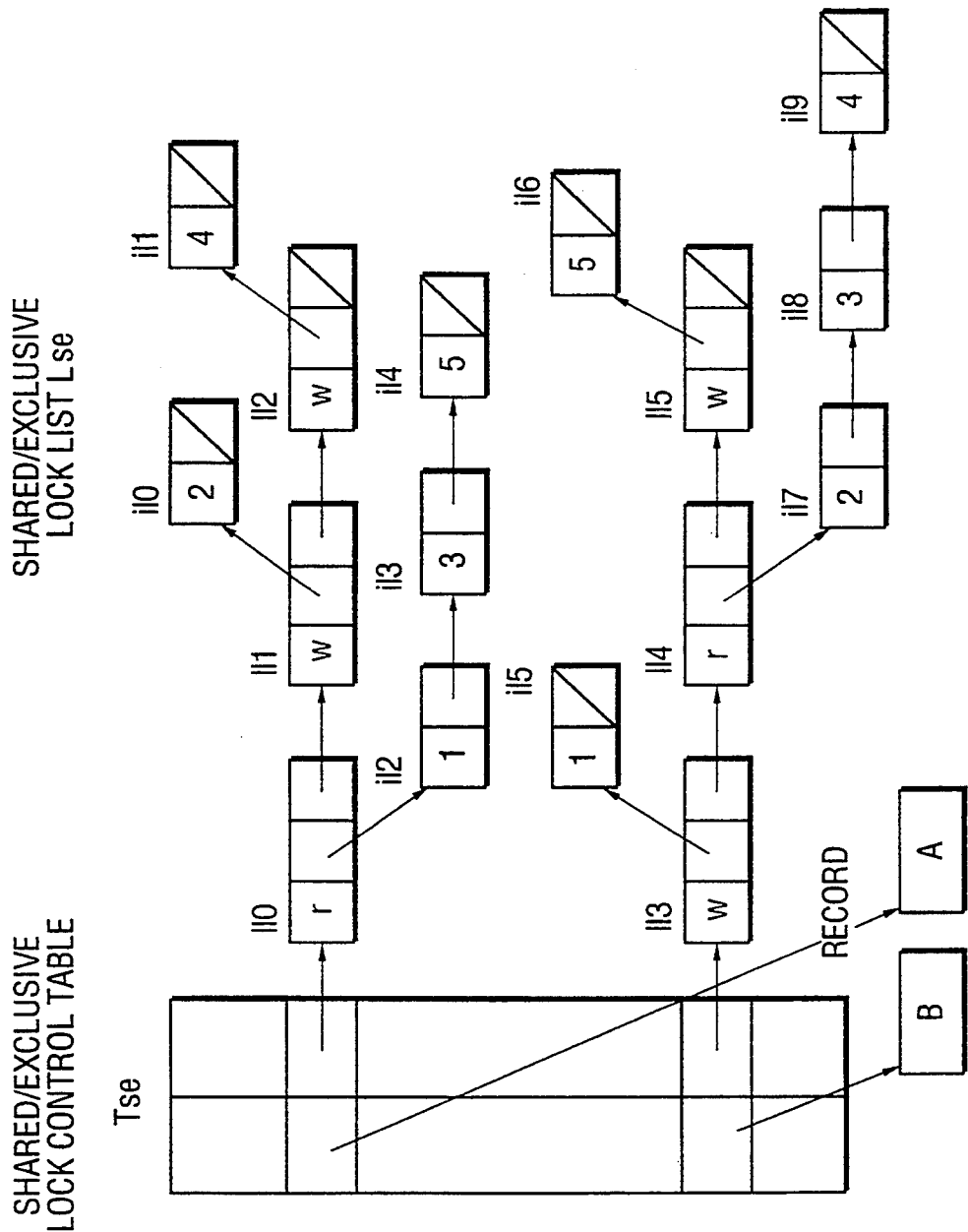
FIG. 21 illustrates a list and a lock control table for controlling a shared lock and an exclusive lock.

FIG. 21 illustrates a list and a lock control table for controlling a shared lock and an exclusive lock. It shows an embodiment of the shared/exclusive lock control table Tse 2020 and the shaped/exclusive lock list Lse 2030.

That is, FIG. 21 shows a state of

A: [r{1,3,5}, w{2}, w{4}]

and

B: [w{1}, r{2,3,4}, w{5}].

Two [2] kinds of list elements are provided for realizing a list for a shared lock. A lock list element LLx (where x is an identification code) directly connected to a shared/exclusive lock control table Tse 2020 has three [3] fields comprising a tag, a pointer to the head end of an identification list and a pointer to the next lock list. The tag is for distinguishing a shared lock from an exclusive lock. FIG. 21 expresses a shared lock as "r" and an exclusive lock as "w". An id list ilx pointed from the second field of the lock list element LLx has two [2] fields comprising an id number and a pointer to the next id list. A shared lock has a shared id connected to the list. The lock list connected to the lock control table,- comprises elements $11_0$, $11_1$, $11_2$; $11_3$, $11_4$, and $11_5$. In the case of the shared lock, id lists comprising elements $i1_2$, $i1_3$, $i1_4$; $i1_5$, $i1_6$ and $i1_7$ are pointed to by the second field of the lock list, thereby resulting in a formation of a list within a list as stated above. The number of elements in an exclusive lock is always one [1]. The pointer pointing to the id list next to the element is always null (expressed by slashes in FIG. 21). An exclusive lock can use a method whereby an id list is not connected and an id is inserted directly in the second field.

Figure 22:
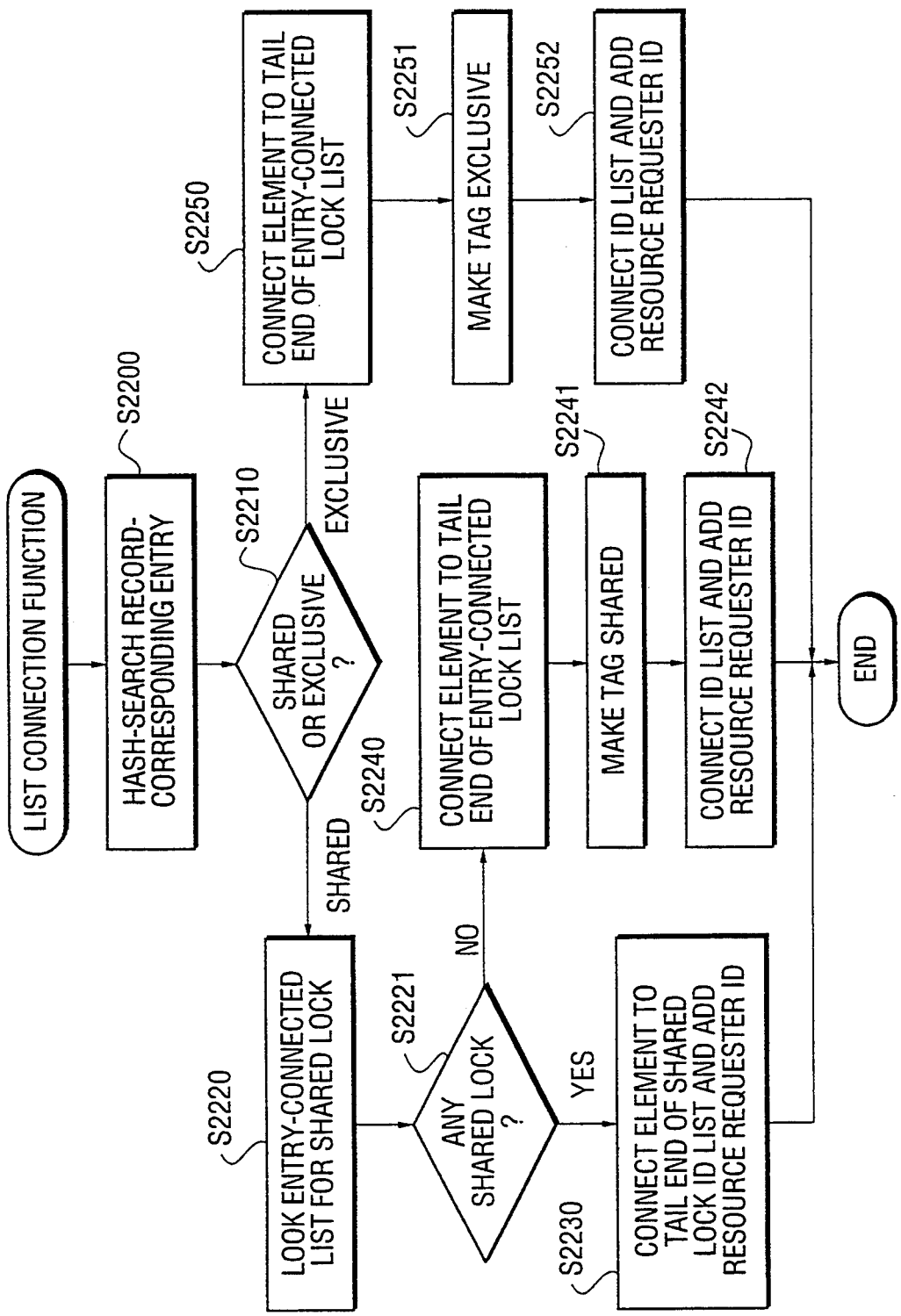
FIG. 22 is an operational flowchart of a list connection processing.

FIG. 22 is an operational flowchart of a list connection processing. It shows the list connection steps of the list connection/disconnection function F 2015, when the lock control table 2020 and the lock list 2030 are used as shown in FIG. 20.

S2200: The list connection/disconnection function F 2015 searches an entry corresponding to a requested records namely, an address of the entry of the lock control table pointing to the record A, by a hash operation. The process then continues to S2210.

S2210: The list connection/disconnection function F 2015 judges whether a lock request to the record is a shared lock or an exclusive lock. If the Judgment is a shared lock (SHARED), the process proceeds to S2220. If the Judgment is an exclusive lock (EXCLUSIVE), the process skips to S2250.

S2220: The list connection/disconnection function F 2015 looks a list connected to an entry for a shared lock. The process then continues to S2221.

S2221: The list connection/disconnection function F 2015 judges whether a shared lock exists or not. If the judgment is affirmative (YES), the process continues to S2230 or not. If the Judgment is negative (NO), the process skips to S2240.

S2230: The list connection/disconnection function F 2015 connects an element to the tail end of the ID list of a shared lock and adds the resource requester ID to the field of the element. For example, an element comprising a resource requester id and a pointer to the next element is connected to the tail end of the last one of id lists $il_2$, $il_3$ and $il_4$. Then, the process terminates.

S2240: The list connection/disconnection function F 2015 connects the element to the tail end of the lock list connected to the entry of the lock control table. The process then continues to S2241.

S2241: The list connection/disconnection function F 2015 has the tag field, in the lock list element llx indicate a shared lock. The process then continues to S2242.

S2242: The list connection/disconnection function F 2015 connects an id list and inserts a resource requester id to a corresponding field. Then the process terminates. For example, if the shared lock does not exist yet, nil of element $ll_2$ of the lock list is removed and the next element is pointed to by the element $ll_2$.

S2250: A list is connected to the tail end of a lock list connected to the lock list. The process continues to S2251.

S2251: The list connection/disconnection function F 2015 has the tag field in the lock list element LLx indicate an exclusive lock. The process continues to S2252.

S2252: The list connection/disconnection function F 2015 connects the id list and adds resource requester ID. Then, the process terminates.

The above steps allow a lock control list such as one shown in FIG. 21 to be created.

FIG. 23 is an operational flowchart of a list disconnection processing. It shows the list disconnection steps of the list connection/disconnection function F 2015, when the lock control table 2020 and the lock list 2030 are used as shown in FIG. 20.

S2300: The list connection/disconnection function F 2015 searches an entry corresponding to a requested record through hash operation. The process then continues to S2310.

S2310: The list connection/disconnection function F 2015 looks at the head end element of the list. The process then continues to S2311.

S2311: The list connection/disconnection function F 2015 judges whether a lock request to the record is a shared lock or an exclusive lock. If the judgment is a shared lock (SHARED), the process proceeds to S2320. If the Judgment is an exclusive lock (EXCLUSIVE), the process skips to S2330.

S2320: The list connection/disconnection function F 2015 disconnects the head end element $il_2$ in the ID list $il_2$, $il_3$ and $il_4$, which is connected to the head end element $ll_0$. The process then continues to S2321.

S2321: The list connection/disconnection function F 2015 Judges whether or not the ID list is null. If the Judgment is affirmative (YES), the process continues to S2322. If the judgment is negative (NO), the element $il_3$ of the id list is connected to a field of the element $ll_o$ and the process terminates.

S2322: The list connection/disconnection function F 2015 disconnects a head, end element $ll_0$ in the lock list connected to the entry and connects element $ll_1$ to the entry of the lock control table. Then, the process terminates.

S2330: The list connection/disconnection function F 2015 disconnects the element at the head end of the lock list connected to the entry. Then, the process terminates. For example, the pointer pointing to the element $ll_1$ is changed to point to the element $ll_2$.

The above steps unlock a shared lock and an exclusive lock.

FIG. 24 is an operational flowchart of a deadlock detection processing.

S2400: The deadlock detection function acquires a list of corresponding resource requester entries. The process then continues to S2410.

S2410: The deadlock detection function Judges whether or not the list includes a shared lock. In FIG. 21, for example, all the elements the lock list $ll_0$, $ll_1$ and $ll_2$ and the id list of $il_0$, $il_1$, $il_2$, $il_3$ and $il_4$ with regard to the entry for the record A are acquired and it is judged whether the shared lock is included in all the elements of the acquired lists. If the judgment is affirmative (YES), the process continues to S2420. If the judgment is negative (NO), the process skips to S2430.

S2420: The deadlock detection function breaks down the lock list and the id list connected to the lock list per the ID list of a shared lock as shown in the above-recited breaking expressions (1) and (2). The process then continues to S2430, merging with the diverted flow due to a negative judgment in S2410.

S2430: The deadlock detection function transfers the lock list and the id list connected to the lock list. The process then continues to S2440.

S2440: The deadlock detection function compares the sequence of resource requester identifiers in the transferred lists with that in the original lists. The process then continues to S2450.

S2450: The deadlock detection function judges whether or not there is any sequence inversion. If the judgment is negative (NO), the process reverts to S2400 in a loop form. If the Judgment is affirmative (YES), a deadlock is detected, and the process terminates.

The present invention checks an inversion of the sequence of the source requester identifier by using the lock control table and the resource requester identifier list where a plurality of resource requesters share a plurality of resources, thereby enabling the deadlock to be detected at high speed, with high reliability and at real time.

In particular, the processing speed of a transaction processing can be improved of by using a plurality of processors by distributing a processing load to detecting a deadlock by using the deadlock detecting method for paralleling a basic processing according to the control flows and data flows among basic processings. By braking down a transaction into a basic processing, a rollback processing after detecting a deadlock eliminates the necessity for redoing the processing for the entire transaction because only the part pertaining to the deadlock needs to be redone. This reduces the processing for a rollback and enables a processing performance to be improved.

The present invention enables a shared lock to be controlled separately from an exclusive lock by using the same lock control table. Therefore, the deadlock can be detailed with ease in a process, in which the shared lock and exclusive lock are mixedly included and the entire processing becomes more efficient.

What is claimed is:

1. A deadlock detection system in a data processor in which a plurality of resources are shared among a plurality of resource requesters, the deadlock detection system comprising:

a lock control table for listing resource identities;

a resource requester identifier list to each entry of said lock control table, for listing one or more resource requester identifiers in association with respective resource identities stored in the lock control table, the one or more resource requester identifiers being listed sequentially in a requesting order in which a leading resource requester identifier corresponding to a leading resource requester, can obtain an exclusive lock on a respective resource; and lock control means for examining the lock control table and the resource requester identifier list, to determine whether a deadlock exists in which a group of resource requester identifiers which are leading resource requester identifiers for respective resources, are listed in respective requesting orders with resource requester identifiers of the group, which are not leading resource requester identifiers, and in which at least one of the leading resource requester identifiers in the group and at least one of the resource requester identifiers in the group which is not a leading resource requester identifier, are not identical for at least one requesting order, the lock control means performing control of the exclusive lock of the respective resource, based on whether the deadlock exists.

2. The deadlock detection system according to claim 1, wherein:

said plurality of resource requesters include transactions to be divided into a plurality of basic processing units forming transaction if a resource requester refers to a transaction, and said basic processing units for a plurality of transactions are concurrently executed in parallel according to dependencies of controls and data among said basic processing units.

3. The deadlock detection system according to claim 2, further comprising:

synchronizing means for establishing a synchronization such that if the deadlock arises, a rollback is performed without changing a resource until all locks in a transaction are acquired.

4. The deadlock detection system according to claim 3, further comprising:

wait means for abandoning already held data and for preventing an update of the resource, when a roll back instruction precedes a control from said synchronizing means.

5. The deadlock detection system according to claim 2, wherein:

said basic processing units become said resource requesters; and said basic processing units, within a transaction, transfer transaction identifiers for listing in the resource requester identifier list as resource requester identifiers so that the lock control means can detect the deadlock in respective basic processing units.

6. The deadlock detection system according to claim 2, wherein a rollback processing to recover from the deadlock is performed only for the basic processing units related to said deadlock.

7. The deadlock detection system according to claim 2, wherein said basic processing units include lock, find, update, wait, replace and unlock units.

8. The deadlock detection system according to claim 1, wherein:

an element of said resource requester identifier list distinguishes a shared lock from an exclusive lock;

a lock list, to be divided in accordance with list elements of the shared lock, is transferred between a plurality of lock control means provided for respective resource requests, and a deadlock is detected by independently checking, at each conflicting source requester, sequence inversions of said resource requester identifiers in the resource requester identifier list.

9. The deadlock detection system according to claim 8, wherein a pointer to an ID list of an element of an exclusive lock and the shared lock is added to said lock list.

10. The deadlock detection system according to claim 9, wherein:

in a list structure for elements of a list for the shared lock and a list for the exclusive lock, $r(i_1, i_2, \ldots, i_m)$, $w(j_1)$, $w(j_2)$, $\ldots w(j_n)$, a lock list element associated with an entry of the lock control table includes a tag field, and a field for storing a pointer pointing to a resource requester list for the shared lock and for storing a pointer pointing to a following lock list, a list of the resource requesters for the shared lock has a structure such that elements, each including a respective resource requester identifier ID for the shared lock and a pointer pointing to the following list element, are provided in a sequence $i_1, i_2, \ldots, i_m$ of resource requesters, and a list of the resource requesters for the exclusive lock has a structure such that an element including a resource requester identifier ID for the exclusive lock and a pointer pointing to a following list element is provided.

11. The deadlock detection system according to claim 8, wherein each element has a tag for distinguishing the shared lock from an exclusive lock.

12. The deadlock detection system according to claim 1, wherein:

one of the resource requesters has an identifier x;
    one of the resource requesters has an identifier y;

a shared lock provided by the resource requester with the identifier x is expressed as r(x), the exclusive lock provided by the resource requester with the identifier y is expressed as w(y), and a lock list associated with the lock control table for a resource A includes elements of a list for the shared lock which are grouped as $r(i_1, i_2, \ldots i_m)$ in a sequence $i_1, i_2, \ldots i_n$ of a request, and elements of the list for the exclusive lock which are independent as $w(j_1), w(j_2), \ldots, w(j_n)$ in a sequence $j_1, j_2, \ldots j_m$ of the request.

13. The deadlock detection system according to claim 12, wherein:

upon detection of the deadlock, the lock list is dissolved as follows:

$$A_{i1}; [r(i_1), W(j_1)W(j_1), \ldots W(j_n)]$$
$$A_{i2}; [r(i_2), W(j_1)W(j_2), \ldots W(j_n)]$$
$$\vdots$$
$$A_{im}; [r(i_m), W(j_1)W(j_2), \ldots W(j_n)]$$

and an inversion of the sequence of the resource requester identifiers is detected.

14. The deadlock detection system according to claim 13, wherein the lock list includes an element having a tag designating the shared lock or the exclusive lock, a pointer pointing to a head of an id list and a pointer pointing to a following lock list.

15. The deadlock detection system according to claim 1, wherein:

where three of the resource requesters operate in parallel, an element j of the resource requester list is provided before an element i, and associated with the element i with regard to a predetermined resource, and an element k, other than elements i and j, is virtually connected to a lock control table, to create a virtual list structure so that a sequence inversion of resource requester identifiers causing the deadlock, can be detected.

16. The deadlock detection system according to claim 15, wherein elements in said resource requester identifier list further include an ID list, for realizing a shared lock.

17. The deadlock detection system according to claim 1, wherein said resource requester identifier list includes a pointer indicating a head end of said resource requester identifier list, for allowing the resource requester corresponding to the resource requester identifier at the head end of the resource requester identifier list, to initiate processing.

18. The deadlock detection system according to claim 1, wherein an entry of said lock control table by the lock control means, is hash-obtained by the resource identifiers through a hash operation.

19. The deadlock detection system according to claim 1, wherein said resource requesters include processes.

20. The deadlock detection system according to claim 1, wherein:

where three of the resource requesters operate in parallel, an element j of the resource requester list is provided before an element i and associated with the element i with regard to a predetermined resource and an element k, other than elements i and j, forms a virtual list structure, so that an inversion in a sequence of resource requester identifiers causing the deadlock, can be detected.

21. A transaction control system in which a plurality of resources is shared by a plurality of transactions, the transaction control system comprising:

means for breaking a transaction into a plurality of basic processing units;

a lock control table for listing resource identities;

a resource requester identifier list for listing one or more resource requester identifiers corresponding to respective basic processing units of said plurality of basic processing units, in association with respective resource identities stored in the lock control table, the one or more resource requester identifiers being listed sequentially in a requesting order in which a leading resource requester identifier corresponding to a leading resource requester, can obtain an exclusive lock on a respective resource;

means for transferring said resource requester identifier list among the plurality of basic processing units; and lock control means for examining the lock control table and the resource requester identifier list, to determine whether a deadlock exists in which a group of the one or more resource requester identifiers which are leading resource requester identifiers for respective resources, are listed in respective requesting orders with the one or more resource requester identifiers of the group, which are not the leading resource requester identifiers, at least one of the leading resource requester identifiers in the group and at least one of the resource requester identifiers in the group which is not a leading resource requester identifier, are not identical for at least one requesting order, the lock control means performing control of an exclusive lock of a respective resource, based on whether the deadlock exists.

22. A deadlock detection system in a data processor in which a plurality of resources are shared among a plurality of resource requesters, the deadlock detection system comprising:

a lock control table listing first and second resource identities;

a resource requester identifier list listing first and second requesting orders in association with respective first and second resource identities, and the first requesting order including first and second resource identifiers, the second requesting order including third and fourth resource requester identifiers, the first requesting order listing the first resource requester identifier before the second resource requester identifier, and the second requesting order listing the third resource requester identifier before the fourth resource requester identifier; and a lock controller coupled to the lock control table and the resource requester identifier list, for detecting a deadlock by determining whether the first resource requester identifier is identical to the third resource requester identifier and whether the second resource requester identifier is identical the fourth resource requester identifier, and for controlling locks to access first and second resources requested by the first and second requesting orders, respectively, based on whether the deadlock exists.

* * * * *

UNITED STATES PATENT AND TRADEMARK OFFICE
CERTIFICATE OF CORRECTION

PATENT NO. : 5,440,743

DATED : August 8, 1995

INVENTOR(S) : Haruo YOKOTA et al.

It is certified that error appears in the above-indentified patent and that said Letters Patent is hereby corrected as shown below:

Column 2, line 17, "Synchronization" should be –synchronization–.

Column 3, line 50, "Jointly" should be –jointly–.

Column 5, line 33, after "it" delete ",";

line 50, delete ","; and line 59, "Judged" should be –judged–.

Column 9, line 23, delete ",".

Column 10, line 19, "00i" should be –001–; and line 23, "O01" should be –001–.

Column 13, line 27, "w{4}.]" should be –w{4}]–.

Column 14, line 13, "Jointly" should be –jointly–;

line 14, "lock," should be –lock.–;

line 27, "tected-in" should be –tected in–; and line 54, "table,-" should be –table–.

UNITED STATES PATENT AND TRADEMARK OFFICE
CERTIFICATE OF CORRECTION

PATENT NO. : 5,440,743

DATED : August 8, 1995

INVENTOR(S) : Haruo YOKOTA et al.

It is certified that error appears in the above-indentified patent and that said Letters Patent is hereby corrected as shown below:

Column 15, lines 5, "records" should be --record,--;

line 10, 12, and 20, "Judgment" should be

--judgment--; and line 35, delete ",".

Column 16, lines 5, 13, and 60, "Judgment" should be

--judgment--;

lines 12 and 34, "Judges" should be --judges--;

Signed and Sealed this

Twelfth Day of December, 1995

Attest:

BRUCE LEHMAN

Attesting Officer

Commissioner of Patents and Trademarks